US010676869B2

(12) United States Patent
Shimaoka et al.

(10) Patent No.: US 10,676,869 B2
(45) Date of Patent: Jun. 9, 2020

(54) COMPOSITION, MATERIAL COMPRISING ULTRAFINE CELLULOSE FIBERS, AND METHOD FOR PRODUCING MATERIAL COMPRISING ULTRAFINE CELLULOSE FIBERS

(71) Applicant: OJI HOLDINGS CORPORATION, Tokyo (JP)

(72) Inventors: Takayuki Shimaoka, Ibaraki (JP); Ikue Homma, Tokyo (JP); Moe Mizukami, Tokyo (JP); Takuri Ozaki, Tokyo (JP)

(73) Assignee: OJI HOLDINGS CORPORATION, Tokyo (JP)

( * ) Notice: Subject to any disclaimer, the term of this patent is extended or adjusted under 35 U.S.C. 154(b) by 38 days.

(21) Appl. No.: 15/760,853

(22) PCT Filed: Sep. 14, 2016

(86) PCT No.: PCT/JP2016/077087
§ 371 (c)(1),
(2) Date: Mar. 16, 2018

(87) PCT Pub. No.: WO2017/047631
PCT Pub. Date: Mar. 23, 2017

(65) Prior Publication Data
US 2019/0085511 A1 Mar. 21, 2019

(30) Foreign Application Priority Data

Sep. 17, 2015 (JP) .................................. 2015-183723
Sep. 17, 2015 (JP) .................................. 2015-183724

(51) Int. Cl.
| | | |
|---|---|---|
| D21H 11/20 | (2006.01) | |
| C08J 3/20 | (2006.01) | |
| C08L 1/16 | (2006.01) | |
| C08L 1/04 | (2006.01) | |
| C08B 15/04 | (2006.01) | |
| C08L 1/02 | (2006.01) | |
| C08B 5/00 | (2006.01) | |
| D21H 17/67 | (2006.01) | |
| D21H 17/68 | (2006.01) | |
| C08K 3/36 | (2006.01) | |

(52) U.S. Cl.
CPC .............. *D21H 11/20* (2013.01); *C08B 5/00* (2013.01); *C08B 15/04* (2013.01); *C08J 3/20* (2013.01); *C08L 1/02* (2013.01); *C08L 1/04* (2013.01); *C08L 1/16* (2013.01); *D21H 17/675* (2013.01); *D21H 17/68* (2013.01); *C08K 3/36* (2013.01)

(58) Field of Classification Search
USPC .................................................... 162/181.6
See application file for complete search history.

(56) References Cited

U.S. PATENT DOCUMENTS

| 6,541,627 | B1 | 4/2003 | Ono et al. |
| 6,698,880 | B1 * | 3/2004 | Campbell ............... B41M 5/508 347/100 |
| 7,939,101 | B2 | 5/2011 | Obae et al. |
| 8,221,789 | B2 | 7/2012 | Obae et al. |
| 9,029,275 | B2 | 5/2015 | Yano et al. |
| 9,243,128 | B2 | 1/2016 | Kumamoto et al. |
| 2004/0053887 | A1 | 3/2004 | Obae et al. |
| 2009/0264036 | A1 | 10/2009 | Yano et al. |
| 2010/0291161 | A1 | 11/2010 | Obae et al. |
| 2012/0283363 | A1 | 11/2012 | Kumamoto et al. |

FOREIGN PATENT DOCUMENTS

| CN | 87105225 A | 3/1988 |
| CN | 1281469 A1 | 1/2001 |
| CN | 102652154 A | 8/2012 |
| CN | 104854276 A | 8/2015 |
| EP | 1 036 799 | 9/2000 |
| EP | 2 511 346 | 10/2012 |
| JP | 2002-503621 A1 | 2/2002 |
| JP | 2008-024788 A | 2/2008 |
| JP | 2012-207056 A | 10/2012 |
| JP | 2013-173861 A | 9/2013 |
| JP | 2013-249448 | 12/2013 |
| JP | 2014-088538 A | 5/2014 |
| WO | 99/28350 A1 | 6/1999 |
| WO | 02/02643 A1 | 1/2002 |

(Continued)

OTHER PUBLICATIONS

Office Action dated Nov. 21, 2018 issued by the Korean Intellectual Property Office in counterpart Korean application No. 10-2018-7010157.
International Search Report & Written Opinion dated Dec. 20, 2016 from the International Bureau in counterpart International application No. PCT/JP2016/077087.
International Preliminary Report on Patentability, dated Mar. 29, 2018 from the International Bureau in counterpart International application No. PCT/JP2016/077087.
Office Action dated Dec. 22, 2015 from the Japanese Patent Office in counterpart Japanese application No. 2015-183724.
Office Action dated Apr. 29, 2019, issued by the Korean Intellectual Property Office in counterpart Korean application No. 10-2018-7010157.

(Continued)

*Primary Examiner* — Mark Halpern
(74) *Attorney, Agent, or Firm* — Sughrue Mion, PLLC

(57) ABSTRACT

An object of the invention is to provide a material or composition comprising ultrafine cellulose fibers having excellent fluidity. The invention relates to a composition comprising a particulate material comprising ultrafine cellulose fibers and water, and (B) a non-cellulose particulate material in which the water content of the composition is 2 to 94% by mass with respect to the total mass of the composition, and the content of (B) the non-cellulose particulate material is 0.1 to 12% by mass with respect to the total mass of the composition. The invention also relates to a method for producing the composition and a method for producing a material comprising ultrafine cellulose fibers.

11 Claims, 2 Drawing Sheets

(56) References Cited

FOREIGN PATENT DOCUMENTS

WO    2011/071156 A1    6/2011
WO    2014/091212 A1    6/2014
WO    2014/124541 A1    8/2014

OTHER PUBLICATIONS

Extended European Search Report (EESR) dated May 15, 2019, issued by the European Patent Office in counterpart European application No. 16846502.9.
Office Action dated Oct. 23, 2019, issued by the Korean Intellectual Property Office in corresponding Korean Application No. 10-2018-7010157.
Office Action dated Dec. 19, 2019 issued from the State Intellectual Property Office of P. R. China in Chinese Application No. 201680054150.8.
Specialty Silica as Flow Aid, Anticaking https://web.archive.org/web/20150430224729/ http://www.aerosil.com/sites/lists/IM/Documents/TI-1213-Specialtysilica-as-flow-aid-anlicaking-agent-and-carriersubstance-EN (2015).

* cited by examiner

[Figure 1]
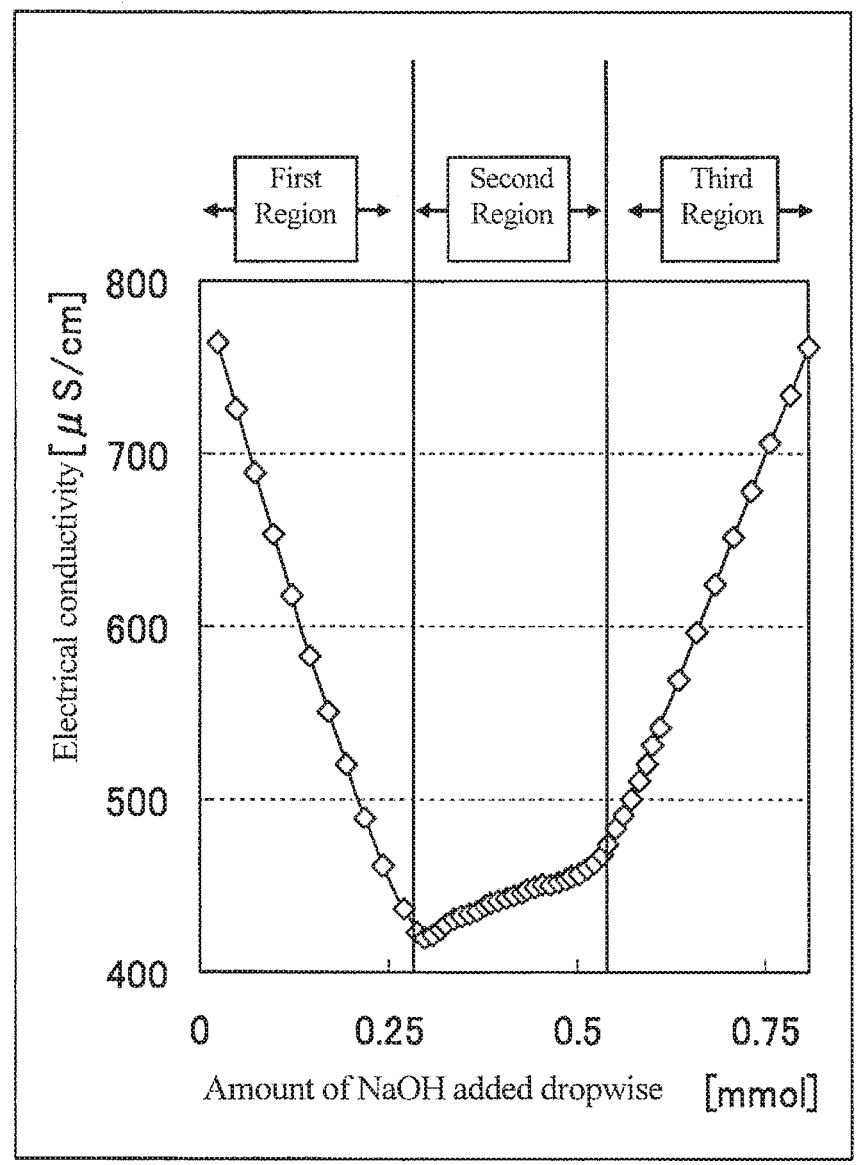

[Figure 2]
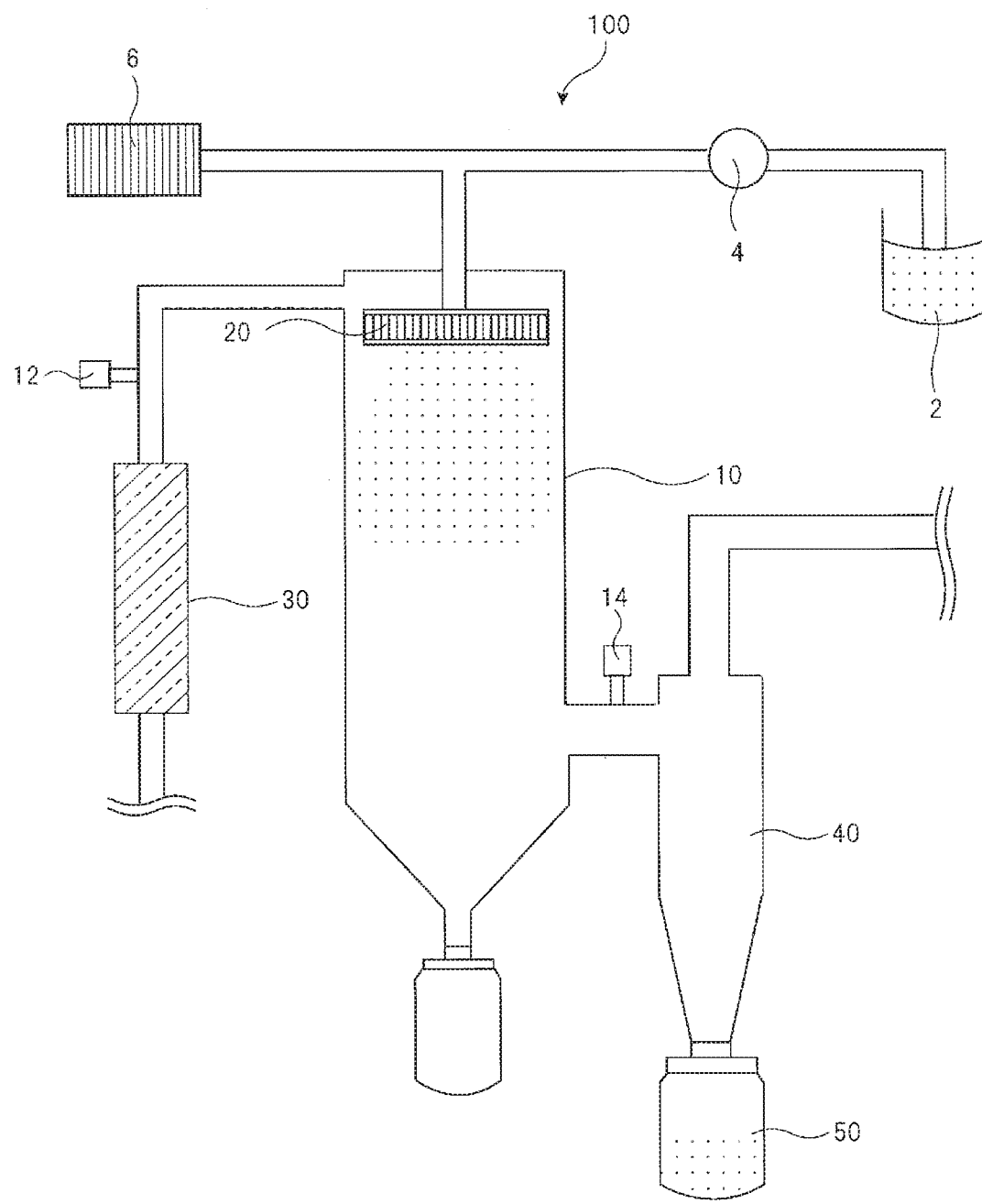

COMPOSITION, MATERIAL COMPRISING ULTRAFINE CELLULOSE FIBERS, AND METHOD FOR PRODUCING MATERIAL COMPRISING ULTRAFINE CELLULOSE FIBERS

CROSS REFERENCE TO RELATED APPLICATIONS

This application is a National Stage of International Application No. PCT/JP2016/077087 filed Sep. 14, 2016, claiming priority based on Japanese Patent Application Nos. 2015-183723 and 2015-183724 filed Sep. 17, 2015.

TECHNICAL FIELD

The present invention relates to a composition, a material comprising ultrafine cellulose fibers, and a method for producing a material comprising ultrafine cellulose fibers.

BACKGROUND ART

In recent years, for the sake of substitution for petroleum resources and from growing awareness of the environment, materials utilizing renewable natural fibers have been drawing attention. Among natural fibers, cellulose fibers having a fiber diameter of 10 to 50 µm, especially cellulose fibers (pulp) originated from wood have been heretofore widely used mainly as a paper product.

In addition, ultrafine cellulose fibers, which have a fiber diameter of 1 µm or smaller, are known as cellulose fibers. A sheet or composite containing ultrafine cellulose fibers has a greatly improved tensile strength because of the remarkably increased number of contact points between fibers. Further, the fiber width is smaller than wavelengths of visible light, and thus the transparency is greatly improved. For example, Patent Document 1 discloses a fiber-reinforced composite material, wherein high transparency is maintained without being affected by temperature conditions and wavelengths, and so on, and various functionalities are imparted by forming a composite of a fiber and a matrix material. Moreover, ultrafine cellulose fibers are also known to be applicable to thickeners or the like.

When ultrafine cellulose fibers are used for a thickener, for example, ultrafine cellulose fibers are dispersed in liquid and the liquid is transported to a processing plant or the like. However, such transport disadvantageously requires high cost because a large amount of a dispersion medium is contained in the liquid containing ultrafine cellulose fibers dispersed therein. For this reason, it has been required for the liquid containing ultrafine cellulose fibers dispersed thereinto to be concentrated as much as possible for reduction of the transport cost.

Powder is known as one of concentrated forms. Techniques for powdering cellulose are conventionally known also in the field of pulp materials. For example, Patent Documents 2 and 3 each disclose a technique for producing powdery cellulose from a wood pulp sheet as a raw material by using a roller mill, cutter mill, or the like. Patent Document 4 discloses a cellulose powder suitable for diluents for compression molding. According to this document, a cellulose powder with excellent compression molding properties is obtained through spray-drying a cellulose dispersion. Further, Patent Document 5 discloses a method for producing a cellulose fine particle aggregate through spray-drying an aqueous suspension containing a cellulose fine particle and a cationic resin.

PRIOR ART DOCUMENTS

Patent Documents

Patent Document 1: JP-A-2008-24788
Patent Document 2: JP-A-2014-88538
Patent Document 3: JP-A-2012-207056
Patent Document 4: International Publication WO 02/02643
Patent Document 5: JP-A-2013-173861

SUMMARY OF INVENTION

Objects to be Solved by the Invention

It appears that cellulose powders preferably have high fluidity, from the viewpoint of easy packing in packaging and easy mixing with other components. Attempts have been made to improve fluidity and so on even for conventional cellulose powders obtained from cellulose with a fiber diameter of around 10 to 50 µm.

However, powders containing ultrafine cellulose fibers suffer from the problem of remarkably inferior fluidity to those of conventional cellulose powders. This problem is due to the fact that ultrafine cellulose fibers are finely-divided fibers with a fiber diameter of nanometer order and have a difference in physical properties from common cellulose fibers, such as high water retention. Thus, it is desired for powders containing ultrafine cellulose fibers to have improved fluidity.

In view of such circumstances, the present inventors conducted research for the purpose of providing a powder containing ultrafine cellulose fibers (hereinafter, also referred to as material comprising ultrafine cellulose fibers, composition, or composition comprising ultrafine cellulose fibers) with excellent fluidity to solve the problems inherent in the above-mentioned conventional techniques.

Means for Solving the Object

The present inventors diligently studied to solve the above problems, and found that a material comprising ultrafine cellulose fibers or composition with excellent fluidity can be obtained through ultrafine cellulose fibers and other components contained in a particular ratio.

Specifically, the present invention includes the following aspects.

[1] A composition comprising (A) a particulate material comprising ultrafine cellulose fibers and water, and (B) a non-cellulose particulate material, wherein
the water content of the composition is 2 to 94% by mass with respect to the total mass of the composition, and
the content of (B) the non-cellulose particulate material is 0.1 to 12% by mass with respect to the total mass of the composition.
[2] The composition according to [1], wherein the content of the ultrafine cellulose fibers is larger than 5% by mass with respect to the total mass of the composition.
[3] The composition according to [1] or [2], wherein the water content of the composition is 15 to 80% by mass with respect to the total mass of the composition.
[4] The composition according to any one of [1] to [3], wherein (B) the non-cellulose particulate material is an inorganic fine particle.

[5] The composition according to any one of [1] to [4], wherein (B) the non-cellulose particulate material is a hydrophobic inorganic fine particle.
[6] The composition according to any one of [1] to [4], wherein (B) the non-cellulose particulate material is a silica fine particle.
[7] The composition according to any one of [1] to [6], wherein (B) the non-cellulose particulate material is a hydrophobic silica fine particle.
[8] The composition according to any one of [1] to [7], wherein the cumulative median diameter of the composition is 100 to 1350 μm.
[9] The composition according to any one of [1] to [8], wherein the angle of repose of the composition is 4 to 500.
[10] The composition according to any one of [1] to [9], wherein the bulk density of the composition is 0.1 to 0.7 g/mL.
[11] The composition according to any one of [1] to [10], wherein the ultrafine cellulose fibers are ultrafine cellulose fibers having an ionic substituent.
[12] The composition according to [11], wherein the ionic substituent is an anionic group.
[13] The composition according to [12], wherein the anionic group is at least one type of substituent selected from a phosphoric acid group, a carboxyl group, and a sulfonic group.
[14] The composition according to any one of [11] to [13], wherein the ultrafine cellulose fibers have 0.1 to 3.5 mmol/g of ionic substituents.
[15] A method for producing a composition, comprising:
concentrating a slurry comprising ultrafine cellulose fibers to yield (A) a particulate material comprising ultrafine cellulose fibers and water, and
mixing (A) the particulate material comprising the ultrafine cellulose fibers and water, and (B) a non-cellulose particulate material.
Further, the present invention includes the following aspects.
[16] A method for producing a material comprising ultrafine cellulose fibers, comprising
spray-drying a slurry comprising ultrafine cellulose fibers and a metal component using a spray drier, wherein
the content of the ultrafine cellulose fibers in the slurry is 0.009 to 5.8% by mass with respect to the total mass of the slurry, and
the ultrafine cellulose fibers have an ionic substituent.
[17] The method for producing a material comprising ultrafine cellulose fibers according to [16], wherein the content of the ultrafine cellulose fibers in the slurry is 0.009 to 2.5% by mass with respect to the total mass of the slurry
[18] The method for producing a material comprising ultrafine cellulose fibers according to [16] or [17], wherein the content of the metal component in the slurry is 1 to 20% by mass with respect to the total mass of the ultrafine cellulose fibers.
[19] The method for producing a material comprising ultrafine cellulose fibers according to any one of [16] to [18], wherein the ionic substituent is an anionic group.
[20] The method for producing a material comprising ultrafine cellulose fibers according to [19], wherein the anionic group is at least one type of substituent selected from a phosphoric acid group, a carboxyl group, and a sulfonic group.
[21] The method for producing a material comprising ultrafine cellulose fibers according to any one of [16] to [20], wherein the ultrafine cellulose fibers have 0.1 to 3.5 mmol/g of ionic substituents.
[22] The method for producing a material comprising ultrafine cellulose fibers according to any one of [16] to [21], wherein the water content of the material comprising ultrafine cellulose fibers is 20% by mass or smaller, Advantageous Effects of Invention According to the present invention, it is possible to obtain a material or a composition comprising ultrafine cellulose fibers having excellent fluidity.

BRIEF DESCRIPTION OF DRAWINGS

FIG. 1 is a graph showing the relationship between the amount of NaOH added dropwise to a fiber raw material and the electrical conductivity.
FIG. 2 is a schematic diagram illustrating the configuration of a spray dryer that may be used according to the present invention.

EMBODIMENT OF CARRYING OUT THE INVENTION

The present invention will be described in detail below. The description on the constituent elements described below may be made based on a representative embodiment or a specific example, but the present invention is not limited to such embodiments. A numerical range expressed by "x to y" herein includes the values of x and y in the range as the minimum and maximum values, respectively.
Further, the value related to the mass of fibers such as cellulose is based on the absolute dry mass (solid content) unless otherwise specified. "A and/or B" means at least one of A and B unless otherwise specified, namely it may be A alone, or B alone, or both A and B.
The present invention relates to a composition or a material comprising ultrafine cellulose fibers. In the present specification, the material comprising ultrafine cellulose fibers is synonymous with the composition or the composition comprising ultrafine cellulose fibers.
(Ultrafine Cellulose Fibers)
Although there is no particular restriction on a cellulose fiber raw material for yielding ultrafine cellulose fibers, pulp is preferably used from the viewpoint of availability and inexpensiveness. The pulp may be selected from wood pulp, non-wood pulp, and deinked pulp. Examples of wood pulp include chemical pulp, such as leaf bleached kraft pulp (LBKP), needle bleached kraft pulp (NBKP), sulfite pulp (SP), dissolving pulp (DP), soda pulp (AP), unbleached kraft pulp (UKP), and oxygen bleached kraft pulp (OKP). Further, included are, but not particularly limited to, semichemical pulp, such as semi-chemical pulp (SCP), and chemi-ground wood pulp (CGP); and mechanical pulp, such as ground pulp (GP), and thermomechanical pulp (TMP, BCTMP). Examples of non-wood pulp include, but not particularly limited to, cotton pulp, such as cotton linter, and cotton lint; non-wood type pulp, such as hemp, wheat straw, and bagasse; and cellulose isolated from ascidian, seaweed, etc., chitin, chitosan and the like. As a deinked pulp, there is deinked pulp using waste paper as a raw material, but it is not particularly limited thereto. The pulp types according to this embodiment may be used singly, or in combination of two or more types. Among the above-listed pulp types, wood pulp and deinked pulp including cellulose are preferred from the viewpoint of easy availability. Among wood pulp, chemical pulp is preferred because the same has a higher cellulose content to enhance the yield of ultrafine cellulose fibers and decomposition of cellulose in the pulp is mild at the time of ultrafine fiber formation (defibration) to yield ultrafine cellulose fibers having a long fiber length with a high aspect ratio. Among them, kraft pulp and sulfite pulp are most preferably selected. A sheet containing the ultrafine cellulose fibers having a long fiber length with a high aspect ratio tends to exhibit a high strength.

The average fiber width of ultrafine cellulose fibers is 1000 nm or smaller as observed with an electron microscope. The average fiber width is preferably 2 to 1000 nm, more preferably 2 to 100 nm, more preferably 2 to 50 nm, and further preferably 2 to 10 nm, but there is no particular restriction thereon. When the average fiber width of ultrafine cellulose fibers is smaller than 2 nm, since they are dissolved in water as cellulose molecules, there appears tendency that the physical properties (strength, stiffness, and dimensional stability) as an ultrafine cellulose fiber are not expressed sufficiently. The ultrafine cellulose fiber is for example, monofilament cellulose having a fiber width of 1000 nm or smaller.

Measurement of an average fiber width of an ultrafine cellulose fiber by electron microscopic observation is carried out as follows. An aqueous suspension of ultrafine cellulose fibers having a concentration of 0.05 to 0.1% by mass is prepared, and the suspension is cast onto a hydrophilized carbon film-coated grid as a sample for TEM observation. If the sample contains wide fibers, SEM images of the surface of the suspension casted onto glass may be observed. The sample is observed using electron microscope images taken at a magnification of 1000×, 5000×, 10000×, or 50000× according to the widths of the constituent fibers. However, the sample, the observation conditions, and the magnification are adjusted so as to satisfy the following conditions:

(1) A single straight line X is drawn in any given portion in an observation image, and 20 or more fibers intersect with the straight line X.

(2) A straight line Y, which intersects perpendicularly with the aforementioned straight line in the same image as described above, is drawn, and 20 or more fibers intersect with the straight line Y.

The widths of the fibers intersecting the straight line X and the straight line Y in the observation image meeting the above-described conditions are visually read. 3 or more sets of images of surface portions, which are at least not overlapped, are thus observed, and the widths of the fibers intersecting the straight line X and the straight line Y are read in the each image. At least 120 fiber widths (20 fibers×2×3=120) are thus read. The average fiber width of ultrafine cellulose fibers (sometimes referred to simply as "fiber width") is an average value of the fiber widths thus read.

Although there is no particular restriction on the fiber length of an ultrafine cellulose fiber, the fiber length is preferably 0.1 to 1000 µm, further preferably 0.1 to 800 µm, and especially preferably 0.1 to 600 µm. By adjusting the fiber length within the above range, it is possible to suppress destruction of a crystalline region of ultrafine cellulose fibers and to adjust the slurry viscosity of ultrafine cellulose fibers within an appropriate range. The fiber length of ultrafine cellulose fibers may be determined by an image analysis using TEM, SEM, or AFM.

Ultrafine cellulose fibers preferably have a type I crystal structure. In this regard, that ultrafine cellulose fibers have a type I crystal structure may be identified by a diffraction profile obtained from a wide angle X-ray diffraction photograph using CuKα ($\lambda$=1.5418 Å) monochromatized with graphite. Specifically, it may be identified by that there are typical peaks at two positions near 2θ=14 to 17°, and near 2θ=22 to 23°.

The percentage of the type I crystal structure occupied in the ultrafine cellulose fibers is preferably 30% or more, more preferably 50% or more, and further preferably 70% or more.

The rate of a crystal portion comprised in ultrafine cellulose fibers is not particularly limited in present invention. It is preferable to use cellulose, in which the crystallinity obtained by an X-ray diffractometry is 60% or more. The crystallinity is preferably 65% or more, and more preferably 70% or more. In this case, more excellent performance can be expected, in terms of heat resistance and the expression of low linear thermal expansion. The crystallinity can be obtained by measuring an X-ray diffraction profile and obtaining it according to a common method (Seagal et al., Textile Research Journal, Vol. 29, p. 786, 1959).

<Chemical Treatment>

Ultrafine cellulose fibers are obtained by defibrating a cellulose raw material. Further, according to the present invention, ionic substituents are preferably added to ultrafine cellulose fibers by performing a chemical treatment on the cellulose raw material before the defibration treatment. The ionic substituent is preferably an anionic group, and examples of the anionic group include at least one type of substituent selected from a phosphoric acid group, a carboxyl group, and a sulfonic group. Among them, the ultrafine cellulose fibers have preferably a phosphoric acid group.

Ultrafine cellulose fibers used in the present invention preferably have 0.1 to 3.5 mmol/g of ionic substituents. Ultrafine cellulose fibers having the aforementioned ionic substituents at the above content are preferred, because such ultrafine cellulose fibers may be fibrillated ultra-finely by an electrostatic repulsion effect. Ultrafine cellulose fibers having ionic substituents are favorable, also because the same may be stabilized in water without aggregation due to the electrostatic repulsion effect.

<General Chemical Treatments>

There is no particular restriction on a method of chemical treatment of a cellulose raw material, insofar as it is a method capable of obtaining ultrafine fibers. Examples of a chemical treatment include an acid treatment, an ozone treatment, a TEMPO (2,2,6,6-tetramethylpiperidine-1-oxyl radical) oxidation treatment, an enzymatic treatment, and a treatment with a compound capable of forming a covalent bond with a functional group in cellulose or a fiber raw material. The ultrafine cellulose fibers used according to the present invention preferably have a phosphoric acid group or a carboxyl group. Therefore, as a chemical treatment method, a treatment with a compound having a phosphoric acid group or a carboxyl group and/or a salt thereof is preferred.

As an example of an acid treatment, there is a method described in Otto van den Berg, Jeffrey R. Capadona; Christoph Weder, Biomacromolecules 2007, 8, 1353-1357. Specifically, ultrafine cellulose fibers are hydrolyzed by sulfuric acid, hydrochloric acid, or the like. In the case of a product by a high-concentration acid treatment, almost all amorphous regions are decomposed so that short fibers are produced (also called as cellulose nanocrystals), but these are also included in ultrafine cellulose fibers.

An example of the ozone treatment is the method described in JP 2010-254726 A, but the example of the ozone treatment is not particularly limited thereto. Specifically, fibers are treated with ozone and are then dispersed in water, and the thus obtained aqueous dispersion of fibers is subjected to a pulverization treatment.

As an example of TEMPO oxidation, there is a method described in Saito, T, et al., "Homogeneous suspensions of individualized microfibrils from TEMPO-catalyzed oxidation of native cellulose", Biomacromolecules, 2006, 7(6), 1687-91. Specifically, after a TEMPO oxidation treatment of fibers, the same are dispersed in water, and the obtained aqueous suspension of the fibers is subjected to a pulverization treatment.

One example of the enzyme treatment can include, but are not particularly limited to, a method described in International Publication No. WO 2013/176033 (the contents described in International Publication No. WO 2013/176033 are incorporated herein by reference in its entirety). Specifically, this method involves treating the fiber raw material with an enzyme at least under a condition where the ratio between the EG activity and the CBHI activity of the enzyme is 0.06 or more.

As an example of a treatment with a compound capable of forming a covalent bond with a functional group in cellulose or a fiber raw material, there is a method described in International Publication WO2013/073652 (PCT/JP2012/079743) in which "at least one compound selected out of an oxo acid, or a polyoxoic acid, having a phosphorus atom in the structure, and salts thereof" is used.

<Introduction of Anionic Substituent>

The ultrafine cellulose fibers preferably have anionic groups. Among others, the anion group is preferably at least one selected from a phosphoric acid group (sometimes referred to also as a phosphate group), a carboxyl group, and a sulfonic group, more preferably at least one selected from a phosphoric acid group, and a carboxyl group, and especially preferably a phosphoric acid group.

<Amount of Introduced Substituent Group>

Although there is no particular restriction on the amount of an ionic substituent to be introduced, it is preferably 0.1 to 3.5 mmol/g per 1 g (mass) of ultrafine cellulose fibers, more preferably 0.14 to 2.5 mmol/g, further preferably 0.2 to 2.0 mmol/g, and further preferably 0.2 to 1.8 mmol/g. By adjusting the amount of the introduced ionic substituent within the above range, fibrillation to ultrafine fibers of a fiber raw material becomes easier, and the stability of ultrafine cellulose fibers may be enhanced. Further by adjusting the amount of the introduced ionic substituent within the above range, the viscosity of the slurry of ultrafine cellulose fibers may be regulated in an appropriate range.

<Introduction of Phosphoric Acid Group>

According to the present invention, ultrafine cellulose fibers have preferably a substituent derived from phosphoric acid such as a phosphoric ester (sometimes referred to simply as a phosphoric acid group).

<Phosphoric Acid Group Introduction Step>

An phosphoric acid group introduction step may be performed by reacting a fiber material containing cellulose with a compound having a phosphoric acid group and/or a salt thereof (hereinafter referred to as "Compound A"). The reaction may be carried out in the presence of urea and/or a derivative thereof (hereinafter referred to as "Compound B"), through which a phosphoric acid group may be introduced to a hydroxyl group of ultrafine cellulose fibers.

The phosphoric acid group introduction step inevitably comprises the step of introducing a phosphoric acid group to cellulose and may comprise, if desired, an alkali treatment step mentioned later, a step of washing off redundant reagents, etc.

One example of the method for allowing compound A to act on the fiber raw material in the presence of compound B includes a method of mixing the fiber raw material in a dry or wet state with a powder or an aqueous solution of compound A and compound B. Another example thereof includes a method of adding a powder or an aqueous solution of compound A and compound B to slurry of the fiber raw material. Among them, a method of adding an aqueous solution of compound A and compound B to the fiber raw material in a dry state, or a method of adding a powder or an aqueous solution of compound A and compound B to the fiber raw material in a wet state is preferred because of the high homogeneity of the reaction. Compound A and compound B may be added at the same time or may be added separately. Alternatively, compound A and compound B to be subjected to the reaction may be first added as an aqueous solution, which is then compressed to squeeze out redundant chemicals. The form of the fiber raw material is preferably a cotton-like or thin sheet form, though the form is not particularly limited thereto.

The compound A used in the present embodiment is a compound having a phosphoric acid group and/or a salt thereof.

Examples of the compound having a phosphoric acid group include, but are not particularly limited to, phosphoric acid, lithium salts of phosphoric acid, sodium salts of phosphoric acid, potassium salts of phosphoric acid, and ammonium salts of phosphoric acid. Examples of the lithium salts of phosphoric acid include lithium dihydrogen phosphate, dilithium hydrogen phosphate, trilithium phosphate, lithium pyrophosphate, and lithium polyphosphate. Examples of the sodium salts of phosphoric acid include sodium dihydrogen phosphate, disodium hydrogen phosphate, trisodium phosphate, sodium pyrophosphate, and sodium polyphosphate. Examples of the potassium salts of phosphoric acid include potassium dihydrogen phosphate, dipotassium hydrogen phosphate, tripotassium phosphate, potassium pyrophosphate, and potassium polyphosphate. Examples of the ammonium salts of phosphoric acid include ammonium dihydrogen phosphate, diammonium hydrogen phosphate, triammonium phosphate, ammonium pyrophosphate, and ammonium polyphosphate.

Among them, from the viewpoints of high efficiency in introduction of the phosphoric acid group, an improving tendency of the defibration efficiency in a defibration step described below, low cost, and industrial applicability, phosphoric acid, sodium phosphate, potassium phosphate, and ammonium phosphate are preferred. Sodium dihydrogenphosphate, or disodium hydrogenphosphate is more preferred.

Further since the uniformity of the reaction is improved and the efficiency in introduction of a phosphoric acid group is enhanced, the Compound A is preferably used as an aqueous solution. Although there is no particular restriction on the pH of an aqueous solution of the Compound A, the pH is preferably 7 or lower because the efficiency in introduction of a phosphoric acid group is high, and more preferably 3 to 7 from the viewpoint of suppression of hydrolysis of a pulp fiber. The pH of an aqueous solution of the Compound A may be adjusted, for example, by using, among compounds having a phosphoric acid group, a combination of an acidic one and an alkaline one, and changing the quantitative ratio thereof. The pH of an aqueous solution of Compound A may also be adjusted by adding an inorganic alkali or an organic alkali to an acidic compound among compounds having a phosphoric acid group.

Although there is no particular restriction on the amount of the Compound A added to a fiber raw material, if the amount of the Compound A added is converted to a phosphorus atomic weight, the amount of phosphorus atoms added with respect to the fiber raw material is preferably 0.5 to 100% by mass, more preferably 1 to 50% by mass, and most preferably 2 to 30% by mass. When the amount of phosphorus atoms added to the fiber raw material is within the above range, the yield of ultrafine cellulose fibers may be more improved. When the amount of phosphorus atoms added to the fiber raw material exceeds 100% by mass, the effect of improving the yield levels off, and the cost of the Compound A used increases. On the other hand, by adjusting the amount of phosphorus atoms added to the fiber raw material not less than the lower limit, the yield may be increased.

Examples of the compound B used in the present embodiment include urea, thiourea, biuret, phenyl urea, benzyl urea, dimethyl urea, diethyl urea, tetramethyl urea, benzoylene urea, and hydantoin. Among them, urea is preferable because it is inexpensive, is easily handled, and easily forms a hydrogen bond with the fiber raw material having a hydroxyl group.

The Compound B is preferably used as an aqueous solution as is the Compound A. Further, an aqueous solution in which both the Compound A and Compound B are dissolved is preferably used, because the uniformity of a reaction may be enhanced. The amount of the Compound B added to a fiber raw material is preferably 1 to 300% by mass.

The reaction system may contain an amide or an amine in addition to the compound A and the compound B. Examples of the amide include formamide, dimethylformamide, acetamide, and dimethylacetamide. Examples of the amine include methylamine, ethylamine, trimethylamine, triethylamine, monoethanolamine, diethanolamine, triethanolamine, pyridine, ethylenediamine, and hexamethylenediamine. Among them, particularly, triethylamine is known to work as a favorable reaction catalyst.

<Amount of Phosphoric Acid Group Introduced>

The amount of a phosphoric acid group introduced is preferably 0.1 to 3.5 mmol/g per 1 g (mass) of ultrafine cellulose fibers, more preferably 0.14 to 2.5 mmol/g, further preferably 0.2 to 2.0 mmol/g, still further preferably 0.2 to 1.8 mmol/g, especially preferably 0.4 to 1.8 mmol/g, and most preferably 0.6 to 1.8 mmol/g. When the amount of the phosphoric acid group introduced is within the range, fibrillation to ultrafine fibers of a fiber raw material may become easier, and the stability of ultrafine cellulose fibers may be enhanced. Further by adjusting the amount of a phosphoric acid group introduced within the above range, the viscosity of the slurry of ultrafine cellulose fibers may be regulated in an appropriate range.

An amount of phosphoric acid introduced into a fiber raw material may be measured by a conductometric titration method. Specifically, an amount introduced may be measured by performing fibrillation to ultrafine fibers in a defibration treatment step, treating the resulting slurry comprising ultrafine cellulose fibers with an ion exchange resin, and then examining a change in the electrical conductivity while adding an aqueous sodium hydroxide solution.

The conductometric titration confers a curve shown in FIG. 1 as an alkali is added. First, the electrical conductivity is rapidly reduced (hereinafter, this region is referred to as the "first region"). Then, the conductivity starts rising slightly (hereinafter, this region is referred to as the "second region"). Then, the increment of the conductivity is increased (hereinafter, this region is referred to as the "third region"). The boundary point between the second region and the third region is defined as a point at which the secondary differential value of conductivity, that is, the change in the increment (gradient) of conductivity becomes maximum. In short, three regions appear. Among them, the amount of the alkali required for the first region among these regions is equal to the amount of a strongly acidic group in the slurry used in the titration, and the amount of the alkali required for the second region is equal to the amount of a weakly acidic group in the slurry used in the titration. When condensation of a phosphoric acid group occurs, the weakly acidic group is apparently lost so that the amount of the alkali required for the second region is decreased as compared with the amount of the alkali required for the first region. On the other hand, the amount of the strongly acidic group agrees with the amount of the phosphorus atom regardless of the presence or absence of condensation. Therefore, the simple term "amount of the phosphoric acid group introduced (or amount of the phosphoric acid group)" or "amount of the substituent introduced (or amount of the substituent)" refers to the amount of the strongly acidic group.

<Introduction of Carboxyl Group>

According to the present invention, when ultrafine cellulose fibers have a carboxyl group, a carboxyl group may be introduced by using a compound having a group derived from a carboxylic acid in the <Phosphoric acid group introduction step>.

Although there is no particular restriction on a compound having a carboxyl group, examples thereof include a dicarboxylic acid compound, such as maleic acid, succinic acid, phthalic acid, fumaric acid, glutaric acid, adipic acid, and itaconic acid, and a tricarboxylic acid compound, such as citric acid, and aconitic acid.

Although there is no particular restriction on an acid anhydride of a compound having a carboxyl group, examples thereof include an acid anhydride of a dicarboxylic acid compound, such as maleic anhydride, succinic anhydride, phthalic anhydride, glutaric anhydride, adipic anhydride, and itaconic anhydride.

Although there is no particular restriction on a derivative of a compound having a carboxyl group, examples thereof include an imide of an acid anhydride of a compound having a carboxyl group, and a derivative of an acid anhydride of a compound having a carboxyl group. Although there is no particular restriction on the imide of an acid anhydride of a compound having a carboxyl group, examples thereof include an imide of a dicarboxylic acid compound, such as maleimide, succinimide, and phthalimide.

There is no particular restriction on a derivative of an acid anhydride of a compound having a carboxyl group. Examples thereof include an acid anhydride of a compound having a carboxyl group, at least a part of the hydrogen atoms of which is substituted with a substituent (e.g. an alkyl group, and a phenyl group), such as dimethylmaleic anhydride, dimethylmaleic anhydride, and diphenylmaleic anhydride.

Among the compounds having a group derived from a carboxylic acid, maleic anhydride, succinic anhydride and phthalic anhydride are preferred because they may be industrially applied easily, and easily gasified, but without any particular limitation thereto.

<Introduction of Cationic Substituent>

In this embodiment, a cationic substituent may be introduced into ultrafine cellulose fibers as an ionic substituent. For example, a cationic substituent may be introduced into a fiber raw material, by adding a cationizing agent and an alkaline compound to a fiber raw material and causing a reaction. As the cationizing agent, one having a group reactive with a quaternary ammonium group and a hydroxy group of cellulose may be used. Examples of the group reactive with a hydroxyl group of cellulose include an epoxy group, a functional group having a structure of halohydrin, a vinyl group, and a halogen group. Specific examples of the cationizing agent include a glycidyltrialkylammonium halide, such as glycidyltrimethylammonium chloride, and 3-chloro-2-hydroxypropyltrimethylammonium chloride, and a halohydrin form compound thereof.

The alkali compound contributes to promotion of a cationization reaction. The alkali compound may be an inorganic alkali compound, such as an alkali metal hydroxide, an alkaline earth metal hydroxide, an alkali metal carbonate, an alkaline earth metal carbonate, an alkali metal phosphate, an alkaline earth metal phosphate; or an organic alkali compound, such as ammonia, an aliphatic amine, an aromatic amine, an aliphatic ammonium, an aromatic ammonium, a heterocyclic compound and a hydroxide, a carbonate, a phosphate, etc. thereof. A measurement of an amount of a cationic substituent introduced may be carried out, for example, by an elemental analysis.

<Alkali Treatment>

In producing ultrafine cellulose fibers, an alkali treatment may be conducted between a substituent introduction step and a defibration treatment step described below. There is no particular restriction on a method of the alkali treatment, and for example a method of immersing a phosphoric acid group-introduced fiber in an alkaline solution may be used.

There is no particular restriction on an alkali compound contained in the alkaline solution, and it may be an inorganic alkaline compound or an organic alkali compound. The solvent of the alkaline solution may be either of water and an organic solvent. The solvent is preferably a polar solvent (water, or a polar organic solvent such as alcohol), and more preferably an aqueous solvent containing at least water.

Among alkaline solutions, a sodium hydroxide aqueous solution, or a potassium hydroxide aqueous solution is especially preferred, because of their multiplicity of uses.

The temperature of the alkali solution in the alkali treatment step is not particularly limited and is preferably 5 to 80° C., more preferably 10 to 60° C.

The dipping time in the alkali solution in the alkali treatment step is not particularly limited and is preferably 5 to 30 minutes, more preferably 10 to 20 minutes.

Although there is no particular restriction on the amount of an alkali solution used in the alkali treatment, it is preferably 100 to 100000% by mass based on the absolute dry mass of the phosphoric acid group-introduced fiber, and more preferably 1000 to 10000% by mass.

In order to reduce the consumption of an alkaline solution in the alkali treatment step, a phosphoric acid group-introduced fiber may be washed with water or an organic solvent before the alkali treatment step. After the alkali treatment, the alkali-treated phosphoric acid group-introduced fiber is preferably washed with water or an organic solvent before the defibration treatment step in order to improve the handling property.

<Defibration Treatment>

The ionic substituent-introduced fiber is subjected to a defibration treatment in a defibration treatment step. In the defibration treatment step, a fiber is defibrated usually using a defibration treatment apparatus to yield a slurry comprising ultrafine cellulose fibers, and there is no particular restriction on a treatment apparatus, or a treatment method.

A high-speed defibrator, a grinder (stone mill-type crusher), a high-pressure homogenizer, an ultrahigh-pressure homogenizer, a high-pressure collision-type crusher, a ball mill, a bead mill, or the like can be used as the defibration treatment apparatus. Alternatively, for example, a wet milling apparatus such as a disc-type refiner, a conical refiner, a twin-screw kneader, an oscillation mill, a homomixer under high-speed rotation, an ultrasonic disperser, or a beater may be used as the defibration treatment apparatus. The defibration treatment apparatus is not limited to the above. Examples of a preferred defibration treatment method include a high-speed defibrator, a high-pressure homogenizer, and an ultrahigh-pressure homogenizer, which are less affected by milling media, and free from apprehension of contamination.

For the defibration treatment, the fiber raw material is preferably diluted into slurry using water and an organic solvent each alone or in combination, though the method is not particularly limited thereto. Water as well as a polar organic solvent can be used as a dispersion medium. Preferred examples of the polar organic solvent include, but are not particularly limited to, alcohols, ketones, ethers, dimethyl sulfoxide (DMSO), dimethylformamide (DMF), and dimethylacetamide (DMAc). Examples of the alcohols include methanol, ethanol, n-propanol, isopropanol, n-butanol, and t-butyl alcohol. Examples of the ketones include acetone and methyl ethyl ketone (MEK). Examples of the ethers include diethyl ether and tetrahydrofuran (THF). One of these dispersion media may be used, or two or more thereof may be used. The dispersion medium may also contain a solid content other than the fiber raw material, for example, hydrogen-binding urea.

According to the present invention, a defibration treatment may be performed after ultrafine cellulose fibers are concentrated and dried. In this case, there is no particular restriction on the method of concentration and drying, and examples thereof include a method in which a concentrating agent is added into a slurry comprising ultrafine cellulose fibers, and a method using a dehydrator, a press, a dryer, and the like used generally. Further, publicly known methods, for example as described in WO2014/024876, WO2012/107642, and WO2013/121086, may be used. Also, the concentrated ultrafine cellulose fibers may be formed into a sheet. It is also possible that the sheet may be pulverized and subjected to a defibration treatment.

As a pulverizing device used for pulverizing ultrafine cellulose fibers, a high-speed defibrator, a grinder (stone mill-type grinder), a high-pressure homogenizer, an ultrahigh pressure homogenizer, a high-pressure collision type crusher, a ball mill, a bead mill, a disk type refiner, a conical refiner, a twin screw kneader, a vibrating mill, a device for wet milling, such as a high-speed rotating homomixer, an ultrasonic disperser, and a beater, may be used without limitation thereto.

Hereinafter, Embodiments of the present invention will be described as the first embodiment and the second embodiment separately.

First Embodiment

The first embodiment relates to a composition comprising ultrafine cellulose fibers, and a method for producing a composition comprising ultrafine cellulose fibers. Since a powder containing ultrafine cellulose fibers (composition comprising ultrafine cellulose fibers) may exert its working-effect when it is dispersed in a solvent such as water, it is also required to exhibit superior redispersibility. The object of the first embodiment is to obtain a composition comprising ultrafine cellulose fibers having excellent fluidity which is also a composition comprising ultrafine cellulose fibers excellent in redispersibility.

<Composition Comprising Ultrafine Cellulose Fibers>

A composition according to the first embodiment comprises (A) a particulate material comprising ultrafine cellulose fibers and water, and (B) a non-cellulose particulate material. The water content of the composition is 2 to 94% by mass with respect to the total mass of the composition, and the content of (B) the non-cellulose particulate material is 0.1 to 12% by mass with respect to the total weight of the composition. The composition may be herein also referred to as a composition comprising ultrafine cellulose fibers, or a material comprising ultrafine cellulose fibers.

The composition of the present invention exhibits excellent fluidity, because the composition comprises (A) a particulate material comprising ultrafine cellulose fibers and water, and (B) a non-cellulose particulate material, and the content of each component is regulated within a predetermined range. Further, the composition of the present invention is excellent in redispersibility into a dispersion medium such as water. It is considered that such effects are obtained by improvement in the fluidity of (A) a particulate material comprising ultrafine cellulose fibers and water itself due to the presence of (B) a non-cellulose particulate material around (A) the particulate material comprising ultrafine cellulose fibers and water. Further, it is considered that the redispersibility is excellent because the composition contains a certain amount of water, and (A) the particulate material comprising ultrafine cellulose fibers and water is finely pulverized.

The composition of the present invention is a particulate material. That is, the composition of the present invention is constituted with a powdery and/or granular substance. In this regard, a powdery substance means a substance smaller than a granular substance. In general, a powdery substance refers to fine particles having a particle diameter of 1 nm or larger and smaller than 0.1 mm, and a granular substance is a particle having a particle diameter of 0.1 to 10 mm, but there is no particular restriction.

The particle diameter of a particulate material herein may be measured and calculated by a laser diffraction method. Specifically, it is a value measured using a laser diffraction scattering particle diameter distribution analyzer (Microtrac 3300 EXII, Nikkiso Co., Ltd.).

The content of ultrafine cellulose fibers in a composition according to the present invention is preferably larger than 5% by mass with respect to the total mass of the composition. The content of ultrafine cellulose fibers is preferably 10% by mass or larger, more preferably 15% by mass or larger, and further preferably 20% by mass or larger. When the content of ultrafine cellulose fibers is adjusted within the above range, the fluidity and redispersibility of the composition may be enhanced more effectively. Also, when the content of ultrafine cellulose fibers is within the above range, the characteristics of ultrafine cellulose fibers may be exhibited easier.

The water content of the composition may be 2 to 94% by mass with respect to the total mass of the composition. The water content is preferably 5 to 92% by mass, more preferably 10 to 90% by mass, further preferably 15 to 80% by mass, and especially preferably 20 to 80% by mass. When the water content is adjusted within the above range, the fluidity and redispersibility of the composition may be enhanced more effectively.

The content of (B) a non-cellulose particulate material in the composition is required to be 0.1 to 12% by mass with respect to the total mass of the composition. The content of (B) a non-cellulose particulate material is preferably 0.4 to 12% by mass, more preferably 1 to 12% by mass, and further preferably 3 to 10% by mass. When the content of (B) a non-cellulose particulate material is adjusted within the above range, the size of a particle in the composition (cumulative median diameter) may be regulated within a desired range, and generation of static electricity and the like may be suppressed. Accordingly, the fluidity of the composition may be enhanced effectively. Further, by adjusting the content of (B) a non-cellulose particulate material within the above range, the dried state of the composition may be regulated to a desired state, so that the redispersibility may be enhanced effectively.

The blending ratio (mass ratio) of ultrafine cellulose fibers to a non-cellulose particulate material in the composition is preferably 1:1 to 200:1. By selecting the blending ratio (mass ratio) of ultrafine cellulose fibers to the non-cellulose particulate material within the above range, the fluidity and redispersibility of the composition may be enhanced more effectively.

The cumulative median diameter of the composition is preferably 100 to 1350 μm, more preferably 200 to 1300 μm, and further preferably 500 to 1200 μm.

In the composition, there is a granular body (powdery/granular body) incorporating one or more particles of (B) a non-cellulose particulate material present around one or more particles of (A) a particulate material comprising ultrafine cellulose fibers and water. There may also be one or more particles of (A) a particulate material comprising ultrafine cellulose fibers and water, and one or more particles of (B) a non-cellulose particulate material existing individually. In other words, the cumulative median diameter of the composition is the overall cumulative median diameter of all kinds of particles (powdery/granular bodies) present in the composition.

By making the cumulative median diameter of the composition equal to or less than the above upper limit value, the surface area of a particle contained in the composition may be adjusted to an appropriate range, and the contact area with a dispersing medium such as water may be enlarged to enhance the redispersibility. When the cumulative median diameter of a composition is adjusted not below the aforementioned lower limit, dusting may be suppressed to improve the fluidity. Further, when the cumulative median diameter of a composition is adjusted not below the aforementioned lower limit, unintended mutual aggregation of particles in the composition may be suppressed to enhance the fluidity and redispersibility.

A cumulative median diameter of a composition may be measured and calculated using a laser diffraction method. Specifically, a particle diameter is measured using a laser diffraction scattering type particle diameter distribution analyzer (Microtrac 3300 EXII, Nikkiso Co., Ltd.). Next, a cumulative curve is obtained based on the total volume of the composition population as 100%, and the particle diameter at the point where the cumulative curve reaches 50% is calculated.

The angle of repose of a composition is preferably 4 to 50°, more preferably 5 to 45°, further preferably 5 to 40°, and especially preferably 10 to 40°. The angle of repose is a parameter related to the fluidity of the composition. When the angle of repose becomes smaller, the fluidity (feedability) of the composition tends to be enhanced, but even when the angle of repose is small, if a large amount of fine particles are present in the composition, the fluidity (feedability) is deteriorates due to dusting. Namely, the angle of repose of a composition is preferably within the above range, which will enhance the fluidity of the composition effectively.

The angle of repose of a composition is measured using an angle of repose tester (AS ONE Corporation). Specifically, 100 mL of a composition is placed in the chute of the angle of repose tester, and the chute gate is opened to drop the composition downward. Then, the angle made by the slope of the dropped composition and the horizontal plane is measured, which is defined as the angle of repose of the composition.

The bulk density of a composition is preferably 0.1 to 0.7 g/mL, more preferably 0.2 to 0.7 g/mL, and further preferably 0.2 to 0.5 g/mL. When the bulk density is higher, the particle diameter of a particle constituting the composition tends to become smaller. As a result, the contact area with a dispersion medium such as water may be made larger, and the redispersibility may be enhanced. On the other hand, when the bulk density is too large, unintended agglomeration of the particles in the composition may occur, which is not preferred. Meanwhile, when the bulk density is too small, the shape of the particles is nonuniform and the particle diameter tends to be large, so that the fluidity (feedability) is deteriorated. Namely, the bulk density of the composition is preferably within the above range, and in such a case the fluidity of the composition may be effectively enhanced.

A bulk density of a composition is measured using an angle of repose tester (AS ONE Corporation). Specifically, 100 mL of a composition is placed in the chute of the angle of repose tester, and the chute gate is opened to drop the composition downward to fill a container (full volume V=50 mL) placed on the bottom to form a heap. Then the heap is leveled off to fill the space just full. The mass of the composition remaining in the container is weighed and the bulk density (g/mL) is calculated from the following expression.

Bulk density (g/mL)=Mass of powder (g)/Volume of powder (mL)

In order to reduce the angle of repose or increase the bulk density, it is also possible to further reduce the water content of a composition. However, when the water content of the composition is too low, the redispersibility of the composition tends to deteriorate.

In order to decrease the angle of repose, or increase the bulk density, it is also possible to increase the amount of (B) a non-cellulose particulate material to be added in a composition. However, when the amount of a non-cellulose particulate material added is too large, the fluidity (feedability) tends to deteriorate due to dusting of (B) a non-cellulose particulate material. Further, when the amount of (B) a non-cellulose particulate material added is increased, the viscosity of a redispersed liquid becomes high due to a large amount of the non-cellulose particulate material, and redispersion becomes difficult.

In other words, it is important according to the present invention, that all of the angle of repose, cumulative median diameter, bulk density, and content ratio of each element such as water content are well balanced.

<(A) Particulate Material Comprising Ultrafine Cellulose Fibers and Water>

The composition according to the present invention contains (A) a particulate material comprising ultrafine cellulose fibers and water. In this regard, the ultrafine cellulose fibers contained in the particulate material are the aforementioned ultrafine cellulose fibers.

The concentration of ultrafine cellulose fibers contained in (A) a particulate material comprising ultrafine cellulose fibers and water is preferably 5% by mass or larger, more preferably 10% by mass or larger, and further preferably 20% by mass or larger with respect to the total mass of the granular material (A). Meanwhile, the water content contained in (A) a particulate material comprising ultrafine cellulose fibers and water is preferably 2 to 94% by mass, more preferably 10 to 90% by mass, further preferably 15 to 80% by mass, and further preferably 20 to 80% by mass with respect to the total mass of the granular material (A).

(A) a particulate material comprising ultrafine cellulose fibers and water may contain a component other than ultrafine cellulose fibers and water. Examples of such other component may include a water-soluble polymer and a surfactant. Examples of the water-soluble polymer include a synthetic water-soluble polymer (such as a carboxyvinyl polymer, poly(vinyl alcohol), an alkyl methacrylate-acrylic acid copolymer, polyvinylpyrrolidone, sodium polyacrylate, poly(ethylene glycol), diethylene glycol, triethylene glycol, propylene glycol, dipropylene glycol, poly(propylene glycol), isoprene glycol, hexylene glycol, 1,3-butylene glycol, and polyacrylamide), a thickening polysaccharide (such as xanthan gum, guar gum, tamarind gum, carrageenan, locust bean gum, quince seed, alginic acid, pullulan, carrageenan, and pectin), a cellulose derivative (such as carboxymethylcellulose, methylcellulose, and hydroxyethylcellulose), a starch (such as cationized starch, raw starch, oxidized starch, etherified starch, esterified starch, and amylose), a glycerin (such as glycerin, diglycerin, and polyglycerin), hyaluronic acid, and a metal salt of hyaluronic acid. As the surfactant, a nonionic surfactant, an anionic surfactant, or a cationic surfactant may be used.

<(B) Non-Cellulose Particulate Material>

A composition according to the present invention comprises (B) a non-cellulose particulate material. The non-cellulose particulate material is a particulate material comprising 1% by mass or smaller of cellulose with respect to the total mass of the non-cellulose particulate material and is preferably a particulate material having a content of cellulose of 0% by mass.

The non-cellulose particulate material is constituted with a powdery and/or granular substance. In this regard, a powdery substance means a substance smaller than a granular substance, and refers to a fine particle having a particle diameter of 1 nm or larger and smaller than 0.1 mm. Further, a granular substance means a particle having a particle diameter of 0.1 to 10 mm. A particle diameter may be calculated by the same method as described in the item of "(A) Particulate material comprising ultrafine cellulose fibers and water".

Among others, (B) a non-cellulose particulate material is preferably a powdery substance. As examples of (B) a non-cellulose particulate material, there are inorganic fine particles and organic fine particles.

Examples of the inorganic fine particles include fine particles composed of a metal, a glass fiber, a rock component, an inorganic compound, or a component produced by chemical synthesis, but are not limited thereto. For example, zeolite, precipitated calcium carbonate, heavy calcium carbonate, magnesium carbonate, kaolin, talc, calcium sulfate, barium sulfate, titanium oxide, zinc oxide, zinc sulfide, zinc carbonate, satin white, carbon black, aluminum silicate, diatomaceous earth, calcium silicate, magnesium silicate, silica, aluminum hydroxide, alumina, alumina hydrate, aluminosilicate, boehmite, pseudoboehmite, and iron oxide may also be included.

Examples of the organic fine particles include fine particles composed of a resin, a component derived from a natural product, a saccharide, or a component produced by chemical synthesis, but are not limited thereto. For example, fine particles of an acrylic resin, polystyrene, polysiloxane, a melamine resin, a benzoguanamine resin, polytetrafluoroethylene, polycarbonate, polyamide, chitin, chitosan, dextrin, oligosaccharide, wheat starch, rice starch, corn starch, potato starch, dextrin, cyclodextrin, lactose, glucose, sugar, reduced malt sugar, sorbitol, erythritol, xylitol, lactitol, mannitol, lactic acid bacteria, and casein may also be included.

Although a single kind of the aforementioned fine particles is preferably used, a combination of plural kinds thereof may also be used.

The primary average particle diameter of (B) a non-cellulose particulate material is preferably 3 to 2000 nm, more preferably 5 to 500 nm, and further preferably 5 to 50 nm. The specific surface area by the BET method of (B) a non-cellulose particulate material is preferably 20 to 500 $m^2/g$, more preferably 30 to 400 $m^2/g$, and further preferably 50 to 300 $m^2/g$. When the primary average particle diameter and the specific surface area of (B) a non-cellulose particulate material are within the aforementioned ranges, the fluidity of the composition may be enhanced more effectively.

According to the present invention, it is preferred to use an inorganic fine particle and more preferred to use a hydrophobic inorganic fine particle as (B) a non-cellulose particulate material. According to the present invention, the hydrophobic inorganic fine particle is preferably a fine particle having a carbon atom content of 1.0% by mass or larger, and more preferably an inorganic fine particle having a hydrophobic group. The content of carbon atoms in the hydrophobic inorganic fine particle is preferably 1.5 to 10% by mass, and more preferably 1.5 to 7% by mass.

As the hydrophobic group, there is for example a group having a hydrocarbon group without a polar group. Examples of the group having a hydrocarbon group include an alkyl group and a phenyl group. Examples of the group having a hydrocarbon group may also include an alkylsilyl group and a group having a siloxane bond. Examples of the alkylsilyl group include a trimethylsilyl group, a triethylsilyl group, and a triisopropylsilyl group. Examples of the group having a siloxane bond include a dimethylpolysiloxane group.

Among them, (B) a non-cellulose particulate material is preferably a silica fine particle, and more preferably a hydrophobic silica fine particle. The hydrophobic silica fine particle is preferably a silica fine particle having a hydrophobic group, and examples of the hydrophobic group include the aforementioned groups. Among others, it is preferred to use a silica fine particle having a trimethylsilyl group, or a silica fine particle having a dimethylpolysiloxane group.

Hydrophobicity may be imparted to an inorganic fine particle by performing a surface treatment using a surface treatment agent. Preferred examples of the surface treatment agent include a silane coupling agent, a silylating agent, a silane coupling agent having a fluorinated alkyl group, an organic titanate coupling agent, an aluminum coupling agent, a silicone oil, and a modified silicone oil.

<Other Component>

A composition of the present invention may further contain a moisture absorbent or the like. Examples of the moisture absorbent include silica gel, zeolite, alumina, carboxymethylcellulose, poly(vinyl alcohol), water-soluble cellulose acetate, poly(ethylene glycol), sepiolite, calcium oxide, diatomaceous earth, activated carbon, activated clay, white carbon, calcium chloride, magnesium chloride, potassium acetate, disodium phosphate, sodium citrate, and a water-absorbing polymer.

Further, a composition of the present invention may further contain other components. As other components, there are, for example, a water-soluble polymer, and a surfactant. Examples of the water-soluble polymer include a synthetic water-soluble polymer (such as a carboxyvinyl polymer, poly(vinyl alcohol), an alkyl methacrylate-acrylic acid copolymer, polyvinylpyrrolidone, sodium polyacrylate, poly(ethylene glycol), diethylene glycol, triethylene glycol, propylene glycol, dipropylene glycol, poly(propylene glycol), isoprene glycol, hexylene glycol, 1,3-butylene glycol, and polyacrylamide), a thickening polysaccharide (such as xanthan gum, guar gum, tamarind gum, carrageenan, locust bean gum, quince seed, alginic acid, pullulan, carrageenan, and pectin), a cellulose derivative (such as carboxymethylcellulose, methylcellulose, and hydroxyethylcellulose), a starch (such as cationized starch, raw starch, oxidized starch, etherified starch, esterified starch, and amylose), a glycerin (such as glycerin, diglycerin, and polyglycerin), hyaluronic acid, and a metal salt of hyaluronic acid. As the surfactant, a nonionic surfactant, an anionic surfactant, or a cationic surfactant may be used.

<Method for Producing Composition Comprising Ultrafine Cellulose Fibers>

The present invention relates to a method for producing a composition, comprising a step of yielding a slurry of ultrafine cellulose fibers; a step of concentrating the slurry comprising ultrafine cellulose fibers to yield (A) a particulate material (concentrate) comprising the ultrafine cellulose fibers and water; and a step of mixing (A) the particulate material (concentrate) comprising the ultrafine cellulose fibers and water, and (B) a non-cellulose particulate material.

The step of yielding a slurry of ultrafine cellulose fibers preferably includes a chemical treatment step and a defibration treatment step as described above. If necessary, another step such as an alkali treatment step may be provided between the chemical treatment step and the defibration treatment step.

The step of concentrating the slurry comprising ultrafine cellulose fibers to yield (A) a particulate material (concentrate) comprising the ultrafine cellulose fibers and water (hereinafter also referred to as a concentration step) is a step of yielding a concentrate by removing a part of the water in a slurry of ultrafine cellulose fibers. In this step, since a part of the water remains in the concentrate, the concentrate contains water and ultrafine cellulose fibers.

The concentration step is preferably a step of adding a concentrating agent to a slurry of ultrafine cellulose fibers to cause gelation. Examples of the concentrating agent include an acid, an alkali, a salt of a polyvalent metal, a cationic surfactant, an anionic surfactant, a cationic polymer flocculant, and an anionic polymer flocculant. Among them the concentrating agent is preferably a salt of a polyvalent metal. Examples of a salt of polyvalent metal include aluminum sulfate, polyaluminum chloride, calcium chloride, aluminum chloride, magnesium chloride, calcium sulfate, and magnesium sulfate.

In the concentration step, a filtration treatment is preferably carried out after addition of a concentrating agent. The filtration treatment step preferably includes a compression step. By providing such a compression step, the content of water in a concentrate may be regulated within a preferred range.

There is no particular restriction on the filter medium used in the filtration treatment step, and a filter medium, such as stainless steel, filter paper, polypropylene, nylon, polyethylene, polyester, etc. may be used. Since an acid may be used sometimes, a filter medium made of polypropylene is preferred. The lower the air permeability of the filter medium is preferred to increase the manufacturing yield. Therefore, it is 30 cm³/cm²·sec or less, more preferably 10 cm³/cm²·sec or less, and further preferably 1 cm³/cm²·sec or less.

In the compression step, a compressing apparatus may be used. As such an apparatus, a general pressing apparatus such as a belt press, a screw press, and a filter press may be used without any particularly restriction on an apparatus.

The concentration of a slurry to be subjected to the compression step is preferably 0.5% by mass or larger, more preferably 1% by mass or larger, and further preferably 2% by mass or larger. By adjusting the concentration of the slurry to be subjected to the compression step within the above range, an increase in the dehydration filtrate may be suppressed, and the dehydration step may be performed efficiently. The pressure at the time of compression is preferably 0.2 MPa or more, and more preferably 0.4 MPa or more.

The concentration step may further include an acid treatment step. The acid treatment step is preferably placed before or after the aforementioned filtration treatment step, and is preferably placed after the filtration treatment step. When the acid treatment step is placed after the filtration treatment step, the acid treatment step may be an acid washing step for removing the concentrating agent.

In the acid treatment step, for example, an inorganic acid (such as sulfuric acid, hydrochloric acid, nitric acid, and phosphoric acid), or an organic acid (such as formic acid, acetic acid, citric acid, malic acid, lactic acid, adipic acid, sebacic acid, stearic acid, maleic acid, succinic acid, tartaric acid, fumaric acid, and gluconic acid) is preferably used for a treatment. Specifically, the concentrate obtained in the above step is preferably immersed in the above acidic liquid. Although there is no particular restriction on the concentration of the acidic liquid to be used, the concentration is preferably 10% or less, more preferably 5% or less, and further preferably 1% or less. When the concentration of the acidic liquid is within the above range, deterioration of cellulose due to decomposition may be suppressed.

Furthermore, filtration is preferably carried out after the acid treatment step. In the filtration treatment step, a compression step may be conducted further.

In the concentration step, a drying step may be provided further. When a drying step is provided, it is preferably provided after the acid treatment step. The drying step is preferably an oven-drying step, and drying is preferably performed, for example, in an oven set at 30 to 70° C. for 1 to 60 min.

The solid concentration of the concentrate obtained in the concentration step is preferably 5% by mass or larger, more preferably 10% by mass or larger, and further preferably 20% by mass or larger.

In the concentration step, dehydration by an organic solvent may be applied as a concentration method. After the concentration using an organic solvent, a drying step may be provided. This is preferred from the viewpoint of redispersibility because hydrogen bonding of ultrafine cellulose fibers may be suppressed by drying after the treatment with an organic solvent.

There is no particular restriction on the organic solvent, and examples thereof may include the following methanol, ethanol, 1-propanol (n-propanol), 1-butanol (n-butanol), 2-butanol, isobutyl alcohol, isopropyl alcohol (isopropanol, 2-propanol), isopentyl alcohol (isoamyl alcohol), t-butyl alcohol (2-methyl-2-propanol), 1,2-dioxane, 1,3-dioxane, 1,4-dioxane, tetrahydrofuran (THF), acetone, methyl isobutyl ketone, methyl ethyl ketone (MEK"), methylcyclohexanol, methylcyclohexanone, methyl-n-butyl ketone, ethyl ether (diethyl ether), ethylene glycol monoethyl ether (cellosolve), ethylene glycol monoethyl ether acetate (cellosolve acetate), ethylene glycol mono-n-butyl ether (butylcellosolve), ethylene glycol monomethyl ether (methylcellosolve), dimethyl sulfoxide (DMSO), dimethylformamide (DMF, N,N-dimethylformamide), dimethylacetamide (DMAc, DMA, N,N-dimethylacetamide), o-dichlorobenzene, xylene, cresol, chlorobenzene, isobutyl acetate, isopropyl acetate, isopentyl acetate (isoamyl acetate), ethyl acetate, n-butyl acetate, n-propyl acetate, n-pentyl acetate (n-amyl acetate), methyl acetate, cyclohexanol, cyclohexanone, dichloromethane (methylene dichloride), styrene, tetrachloroethylene (perchloroethylene), 1,1,1-trichloroethane, toluene, n-hexane, chloroform, carbon tetrachloride, 1,2-dichloroethane (ethylene dichloride), 1,2-dichloroethylene (acetylene dichloride), 1,1,2,2-tetrachloroethane (acetylene tetrachloride), trichloroethylene, carbon disulfide, gasoline, coal tar naphtha (including solvent naphtha), petroleum ether, petroleum naphtha, petroleum benzine, turpentine oil, and mineral spirits (including mineral thinners, petroleum spirits, white spirits, and mineral turpentine).

The organic solvent is not particularly limited and preferably has miscibility with water and more preferably further has polarity. Preferred examples of the organic solvent having polarity include, but are not particularly limited to, alcohols, dioxanes (1,2-dioxane, 1,3-dioxane, and 1,4-dioxane), and tetrahydrofuran (FHF). Specific examples of the alcohols include methanol, ethanol, n-propanol, isopropanol, n-butanol, and t-butyl alcohol. Other preferred examples of the organic solvent having polarity include ketones, ethers, dimethyl sulfoxide (DMSO), dimethylformamide (DMF), and dimethylacetamide (DMAc). Examples of the ketones include acetone and methyl ethyl ketone (MEK). Examples of the ether may include diethyl ether and tetrahydrofuran (THF). The solubility parameter value (SP value) may be taken into consideration for selecting an organic solvent. Since it has been empirically known that the solubility increases as the difference between the SP values of the two components decreases, from the viewpoint of good miscibility with water, an organic solvent having an SP value close to that of water may be selected.

Concentration or drying may be carried out by combining a concentrating agent and an organic solvent. Although there is no particular restriction on the order of the steps, a treatment with an organic solvent is preferably performed after the concentration with a concentrating agent, because the consumption of an organic solvent may be reduced.

When a concentrating agent and an organic solvent are combined for conducting concentration or drying, a concentrating agent is used to adjust the concentration of ultrafine cellulose fibers to 5% by mass or larger, more preferably 10/by mass or larger, and further preferably 20% by mass or larger prior to the addition of the organic solvent. The concentration of ultrafine cellulose fibers is preferably in the above range, because the necessary amount of an organic solvent is suppressed.

An alkaline or acidic solution may be added before a treatment with an organic solvent, or after the treatment, or during the treatment. When an alkaline solution is added, the concentrate may be redispersed easily, because the electric charge on the ultrafine cellulose fibers is increased during redispersion of the concentrate. Since the concentrate is swollen by adding an alkaline solution, which may impair the degree of concentration, it is preferred to add the same in the presence of an organic solvent. An organic solvent is capable of suppressing swelling.

Although an acidic solution is used to remove a concentrating agent from the concentrate or the dried matter of ultrafine cellulose fibers, it becomes possible by the coexistence of an organic solvent to suppress swelling of the concentrate or the dried matter of ultrafine cellulose fibers, from which the concentrating agent has been removed.

When a combination of a concentrating agent and an organic solvent is used, there is no particular restriction on the amount of an organic solvent to be used, however it is preferably 100 to 100000% by mass, more preferably 100 to 10000% by mass, and further preferably 100 to 1000% by mass with respect to the absolute dry mass of the ultrafine cellulose fibers. The amount of an organic solvent to be used is preferably within the above range, because the swelling inhibiting effect is sufficiently obtained, while suppressing the consumption of the organic solvent.

One type of these concentrating agents may be used, or two or more thereof may be used in combination. Examples of the drying method include a method using a dryer for general use.

A step of mixing (A) a particulate material comprising ultrafine cellulose fibers and water, and (B) a non-cellulose particulate material (hereinafter also referred to as mixing step) is a step where (B) a non-cellulose particulate material is added to (A) a particulate material comprising ultrafine cellulose fibers and water and the mixture is stirred for blending. In the mixing step, stirring and blending are preferably performed with a stirrer.

For the mixing step, another method may also be adopted, in which the non-cellulose particulate material is added after (A) the particulate material comprising ultrafine cellulose fibers and water is redispersed in a solution. In the mixing step, it is preferred to adopt a method in which the fluidity of (A) the particulate material comprising ultrafine cellulose fibers and water is secured, and uniform stirring of the same with the non-cellulose particulate material is possible.

Through the above steps, a composition comprising ultrafine cellulose fibers is obtained. The storage temperature of the composition is preferably 4 to 40° C., and more preferably 4 to 30° C. The storage pressure is preferably normal pressure. The humidity is preferably 70% or less, and more preferably 60% or less.

When a composition comprising ultrafine cellulose fibers is stored, it is preferred to place the composition in a bag such as an aluminum pouch, or a hermetic container, and seal it hermetically for storage. Also, the aluminum pouch or the sealed container may be transported as it is.

Second Embodiment

The second embodiment is related to a method for producing a material comprising ultrafine cellulose fibers. The second embodiment is related to a method for producing a material comprising ultrafine cellulose fibers, comprising a step of spray-drying a slurry comprising ultrafine cellulose fibers using a spray dryer. Although the second embodiment is preferably a method for producing a material comprising ultrafine cellulose fibers described below, it may also be a part of the aforementioned method for producing a composition comprising ultrafine cellulose fibers. For example, a step (concentration step) of yielding (A) a particulate material comprising ultrafine cellulose fibers and water (concentrate) may be a step of spray-drying using a spray dryer. In this case, in a step of yielding (A) a particulate material comprising ultrafine cellulose fibers and water (concentrate), production conditions, etc., which will be described below, may also be adopted. In the second Embodiment, a cellulose powder having excellent fluidity may be produced by performing spray drying using a spray dryer.

(Method for Producing Material Comprising Ultrafine Cellulose Fibers)

The second embodiment relates to a method for producing a material comprising ultrafine cellulose fibers, comprising a step of spray-drying a slurry comprising ultrafine cellulose fibers and a metal component using a spray dryer. The content of ultrafine cellulose fibers in a slurry used in a production method according to the present invention is 0.009 to 5.8% by mass with respect to the total mass of the slurry. Further, the ultrafine cellulose fibers contained in the slurry have ionic substituents.

As the ultrafine cellulose fibers, out of the aforementioned ultrafine cellulose fibers, those having ionic substituents may be used. The ultrafine cellulose fibers obtained by the above method form a slurry usable for spray drying, when they are diluted with water to a desired concentration as described below. The slurry thus obtained is spray-dried using a spray drier to produce a material comprising ultrafine cellulose fibers.

The content of ultrafine cellulose fibers in the slurry used in the production method according to the present invention can be 0.009 to 5.8% by mass with respect to the total mass of the slurry, and is preferably 0.009 to 4% by mass, more preferably 0.009 to 3.5% by mass, further preferably 0.009 to 2.5% by mass, and especially preferably 0.009 to 2.0% by mass.

According to the present invention, by adjusting the content of the ultrafine cellulose fibers in the slurry within the above range, the average particle diameter of the obtained material comprising ultrafine cellulose fibers may be regulated to an appropriate range. By this means, it becomes possible to increase the fluidity, and also to suppress occurrence of dusting. Therefore, by the production method according to the present invention, the productivity of a material comprising ultrafine cellulose fibers may be enhanced.

When the content of ultrafine cellulose fibers in the slurry is not more than the upper limit, the average particle diameter of an obtainable material comprising ultrafine cellulose fibers becomes small, and the fluidity may be improved. Further, when the content of ultrafine cellulose fibers in the slurry is not less than the aforementioned lower limit, it becomes possible to inhibit an obtainable material comprising ultrafine cellulose fibers from forming too fine particles, or to suppress a decrease in yield caused by adhesion to the side wall of a drying oven or the like due to static electricity. Further, energy required for evaporating water may be reduced. Furthermore, it becomes less susceptive to an influence of static electricity, so the fluidity may be improved.

Further, a slurry used in the production method according to the present invention contains a metal component. In this regard, the content of the metal component in the slurry is preferably 1 to 20% by mass and more preferably 3 to 15% by mass with respect to the total mass of the ultrafine cellulose fibers.

In the production method according to the present invention, and in a slurry including ultrafine cellulose fibers having ionic substituents, and a metal component, the fluidity of an obtainable material comprising ultrafine cellulose fibers (particulate material) may be enhanced by adjusting the concentration of ultrafine cellulose fibers in the slurry within a predetermined range.

According to the present invention, by using ultrafine cellulose fibers having ionic substituents, a mixed liquid in which a metal component is uniformly dispersed in the slurry may be prepared. When a metal component is added, the metal component suppresses mutual aggregation of the ultrafine cellulose fibers in drying to form a fine particulate material. Because of its fineness, the particulate material is able to exhibit high fluidity.

A slurry comprising ultrafine cellulose fibers may contain other components. Examples of such other components may include those enumerated in the aforementioned first embodiment for other component which (A) a particulate material comprising ultrafine cellulose fibers and water may contain. Preferred examples may include the aforementioned water-soluble polymers and surfactants.

In this regard, the material comprising ultrafine cellulose fibers is a particulate material obtained by performing spray drying using a spray drier. The definition of the particulate material and the method of measuring the particle diameter of the particulate material are similar to those described in the item of <Composition comprising ultrafine cellulose fibers>.

(Spray Drying Step)

The method for producing a material comprising ultrafine cellulose fibers according to the present invention includes a step of spray-drying a slurry comprising ultrafine cellulose fibers and a metal component using a spray dryer. A spray dryer is an apparatus that atomizes a solution such as a slurry by a sprayer, such as a disk atomizer, and a nozzle, to increase the surface area, and bring it into contact with hot air to be dried in a short time. The spray dryer used in the present invention generally includes as main components a slurry vessel, a drying oven, a sprayer, a hot air generator, and a recovery tank.

FIG. 2 is a schematic view for illustrating a configuration of a spray dryer that may be used according to the present invention. As shown in FIG. 2, a spray dryer 100 that may be used according to the present invention includes a slurry vessel 2, a drying oven 10, a sprayer 20, a hot air generator 30, and a recovery tank 50.

The slurry vessel 2 is a vessel for holding a slurry comprising ultrafine cellulose fibers and a metal component. In this regard, the content of the ultrafine cellulose fibers is adjusted to be 0.009 to 5.8% by mass, preferably 0.009 to 4% by mass, more preferably 0.009 to 3.5% by mass, further preferably 0.009 to 2.5% by mass, and especially preferably 0.009 to 2.0% by mass with respect to the total mass of the slurry.

Further, in the slurry vessel 2, the content of the metal component is preferably adjusted to be 1 to 20% by mass and more preferably 3 to 15% by mass with respect to the total mass of the ultrafine cellulose fibers.

Conventionally, spray-drying using a spray dryer tended to avoid a condition of low slurry concentration. This is because it is intended to produce a powdery/granular body of interest efficiently by increasing the slurry concentration to enhance the drying efficiency. Further, when the slurry concentration is set low, there has been a risk that the slurry may not be dried sufficiently and adheres to the side wall of the drying oven, therefore the condition of low slurry concentration has been avoided. However, according to the present invention, by adjusting the concentration of ultrafine cellulose fibers having ionic substituents at a predetermined slurry concentration, and adding a metal component, a particulate material having good properties may be obtained in high yield despite a low slurry concentration.

The slurry vessel 2 is preferably equipped with a stirring device, and it is preferably equipped with, for example, a magnetic stirrer, and a vertical shaft stirring device.

The slurry prepared in the slurry vessel 2 is transferred to a sprayer 20 provided in the drying oven 10 by a pump 4. In doing so, air is preferably supplied from a pressurized air generator 6 to the sprayer 20. This makes it possible to atomize the slurry efficiently.

The drying oven 10 is equipped with the sprayer 20. In the drying oven 10, a slurry is sprayed from a sprayer 20, and at the same time hot air is supplied from a hot air generator 30. In the drying oven 10, the hot air is brought into contact with the slurry atomized into fine particles by the sprayer to dry a solvent contained in the slurry in a short time, so that granulation is carried out. In this way, a material comprising ultrafine cellulose fibers (particulate material) is formed.

The temperature of the hot air fed into the drying oven 10 is preferably 150 to 350° C., more preferably 180 to 320° C., and further preferably 180 to 250° C. The temperature of the hot air fed into the drying oven is a temperature detected by an inlet temperature sensor 12 provided between the hot air generator 30 and the drying oven 10. Namely, according to the present invention, the inlet temperature of the hot air is preferably within the above range, and by adjusting the inlet temperature within the above range, granulation may be performed efficiently. Further, by adjusting the inlet temperature within the above range, occurrence of a trouble such as discoloration of the obtained material comprising ultrafine cellulose fibers (particulate material) may be suppressed.

There is no particular restriction on the sprayer 20, insofar as it is capable of spraying a slurry transferred from the slurry vessel 2 into the form of fine particles. Examples of the sprayer 20 may include a disk atomizer, and a nozzle. A disk atomizer sprays a slurry utilizing a centrifugal force caused by rotation. Further, as for nozzle, there are a pressure nozzle in which a liquid having been pressurized and imparted with a turning force by a pump is formed into a film through an orifice, and then atomized into fine particles, and a two-fluid nozzle that atomizes a slurry by a shearing power of high-pressure air. A sprayer is preferably selected among them according to the particle shape of the particulate material or the slurry properties. According to the present invention, use of a disk atomizer is preferred. By doing so, the regulation of the particle diameter of the material comprising ultrafine cellulose fibers (particulate material) within the desired range tends to become easier.

When a disk atomizer is used as the sprayer 20, the number of revolutions of the atomizer is preferably 10,000 to 30,000 rpm, and more preferably 15,000 to 25,000 rpm. By adjusting the number of revolutions of the atomizer within the above range, sufficient atomization may be achieved when the slurry is sprayed, and a particulate material superior in fluidity tends to be obtained easily.

The amount of water evaporated in the drying oven 10 is preferably 10 to 200 kg/hour, more preferably 20 to 150 kg/hour, and further preferably 30 to 100 kg/hour. By adjusting the amount of water evaporated in the drying oven 10 within the above range, a particulate material superior in fluidity tends to be obtained easily.

The material comprising ultrafine cellulose fibers (particulate material) granulated in the drying oven 10 is collected with a collector 40. Examples of the collector include a cyclone collector, and a bag filter. Classification may also be carried out by installing a plurality of cyclones. A suction device or the like (not illustrated) is preferably connected with the collector 40, and a particulate material is collected by a suction action.

The material comprising ultrafine cellulose fibers (particulate material) collected with the collector 40 is held in a recovery tank 50 connected with the lower part of the collector 40. Classification may be performed by, for example, providing a filter or the like at a connecting part between the collector 40 and the recovery tank 50. The collector 40 and the recovery tank 50 are detachably connected to each other, and the particulate material accumulated in the recovery tank 50 may be transferred appropriately to a filling and storing step, or transferred to a classification step or the like.

An outlet temperature sensor 14 may be provided between the drying oven 10 and the collector 40. The outlet temperature sensor 14 is for detecting the outlet temperature of the drying oven 10. In this regard, the outlet temperature is preferably 40 to 200° C., and more preferably 60 to 150° C. When the outlet temperature is within the above range, granulation may be performed efficiently.

A spray dryer to be used according to the present invention is not limited to the one having the above structure. As a spray dryer, a general commercially supplied apparatus may be used. For example, a Model ODA-25 manufactured by Ohkawara Kakohki Co., Ltd. may be used.

The storage temperature and the storage humidity of the material comprising ultrafine cellulose fibers yielded by the aforementioned production method are the same as the storage temperature and storage humidity of the aforementioned composition comprising ultrafine cellulose fibers. Also, the sealed form is the same as the sealed form of the aforementioned composition comprising ultrafine cellulose fibers.

<Metal Component>

The slurry used in the production method of the second embodiment contains a metal component. The metal component includes, for example, at least one of a metal and a metal oxide. Examples of the metal component include a fine particle composed of a metal, such as titanium, zinc, iron, zirconium, tungsten, aluminum, and calcium, and a metal oxide, such as titanium oxide, zinc oxide, iron oxide, zirconium oxide, tungsten oxide, aluminum oxide, and calcium oxide. Among others, a metal oxide is preferably used, and titanium oxide is especially preferably used.

The average primary particle diameter of a metal component is preferably 3 to 2000 nm, more preferably 5 to 500 nm, and further preferably 5 to 50 nm. The specific surface area by the BET method of a metal component is preferably 20 to 500 $m^2/g$, more preferably 30 to 400 $m^2/g$, and further preferably 50 to 300 $m^2/g$. By adjusting the average primary particle diameter and the specific surface area of a metal component within the above ranges, the fluidity of a material comprising ultrafine cellulose fibers may be enhanced more effectively.

According to the present invention, a metal component is preferably a hydrophobic metal oxide. The hydrophobic metal oxide is preferably a metal oxide having a carbon atom content of 1.0% by mass or larger, and more preferably a metal oxide having a hydrophobic group. The content of carbon atoms in the hydrophobic metal oxide is preferably 1.5 to 10% by mass, and more preferably 1.5 to 7% by mass.

As the hydrophobic group, there is for example a group having a hydrocarbon group without a polar group. Examples of the group having a hydrocarbon group include an alkyl group and a phenyl group. Examples of the group having a hydrocarbon group may also include an alkylsilyl group and a group having a siloxane bond. Examples of the alkylsilyl group include a trimethylsilyl group, a triethylsilyl group, and a triisopropylsilyl group. Examples of the group having a siloxane bond include a dimethylpolysiloxane group.

Among them, a metal component is preferably titanium oxide, and more preferably a hydrophobic titanium oxide. The hydrophobic titanium oxide is preferably titanium oxide having a hydrophobic group, and examples of the hydrophobic group may include the aforementioned groups.

Hydrophobicity may be imparted to a metal component by performing a surface treatment using a surface treatment agent. Preferred examples of the surface treatment agent include a silane coupling agent, a silylating agent, a silane coupling agent having a fluorinated alkyl group, an organic titanate coupling agent, an aluminum coupling agent, a silicone oil, and a modified silicone oil.

<Material Comprising Ultrafine Cellulose Fibers>

The present invention may also be related to a material comprising ultrafine cellulose fibers produced by the aforementioned method for producing a material comprising ultrafine cellulose fibers. A material comprising ultrafine cellulose fibers produced by the method for producing material comprising ultrafine cellulose fibers is superior in fluidity, and has favorable properties as a particulate material.

The water content of the material comprising ultrafine cellulose fibers is preferably 20% by mass or smaller, more preferably 15% by mass or smaller, and further preferably 10% by mass or smaller with respect to the total mass of the material comprising ultrafine cellulose fibers. When the water content is adjusted within the above range, the fluidity of the material comprising ultrafine cellulose fibers may be enhanced more effectively.

The cumulative median diameter of a material comprising ultrafine cellulose fibers is similar to the preferred range of the cumulative median diameter of a composition comprising ultrafine cellulose fibers in the first embodiment described above. The method for calculating the cumulative median diameter of a material comprising ultrafine cellulose fibers is the same as the method for calculating the cumulative median diameter of a composition comprising ultrafine cellulose fibers in the first embodiment described above.

The angle of repose of a material comprising ultrafine cellulose fibers is similar to the preferred range of the angle of repose of a composition comprising ultrafine cellulose fibers in the first embodiment described above. The method for measuring the angle of repose of a material comprising ultrafine cellulose fibers is the same as the method for measuring the angle of repose of a composition comprising ultrafine cellulose fibers in the first embodiment described above.

The bulk density of a material comprising ultrafine cellulose fibers is similar to the preferred range of the bulk density of a composition comprising ultrafine cellulose fibers in the first embodiment described above. The method for measuring the bulk density of a material comprising ultrafine cellulose fibers is the same as the method for measuring the bulk density of a composition comprising ultrafine cellulose fibers in the first embodiment described above.

<Other Component>

The material comprising ultrafine cellulose fibers may further contain another component. In a case where the material comprising ultrafine cellulose fibers contains another component, such other component may be added to and mixed with a material comprising ultrafine cellulose fibers obtained after spray drying, or may be added in the slurry before spray drying. Examples of other components may be the same other components as described in the item of <Other component> for the first embodiment.

(Redispersion)

The composition comprising ultrafine cellulose fibers obtained in the first embodiment and the material comprising ultrafine cellulose fibers obtained in the second embodiment are preferably used after being redispersed in a solvent such as water. There is no particular restriction on a solvent to be used to yield such redispersed slurry, and examples thereof may include water, an organic solvent, and a mixture of water and an organic solvent. Examples of the organic solvent include an alcohol, a polyhydric alcohol, a ketone, an ether, dimethylsulfoxide (DMSO), a dimethylformamide (DMF), and a dimethylacetamide (DMAc). Examples of an alcohol include methanol, ethanol, n-propanol, isopropanol, n-butanol, and t-butyl alcohol. Examples of a polyhydric alcohol include ethylene glycol, and glycerin. Examples of a ketone include acetone, and methyl ethyl ketone. Examples of an ether include diethyl ether, tetrahydrofuran, ethylene glycol monomethyl ether, ethylene glycol monoethyl ether, ethylene glycol mono n-butyl ether, and ethylene glycol mono-t-butyl ether.

Redispersion of a composition comprising ultrafine cellulose fibers may be carried out by a conventional method. For example, redispersion may be carried out by a step of preparing a liquid containing a composition comprising ultrafine cellulose fibers by adding the aforementioned solvent to a composition comprising ultrafine cellulose fibers, and a step of dispersing the ultrafine cellulose fibers in the liquid containing a composition comprising ultrafine cellulose fiber.

As a dispersing apparatus used in the step of dispersing ultrafine cellulose fibers in the liquid containing a composition comprising ultrafine cellulose fibers, an apparatus similar to the defibration treatment apparatus described in the <Defibration treatment> above may be used.

(Application)

There is no particular restriction on the application of the composition comprising ultrafine cellulose fibers obtained in the first embodiment and the material comprising ultrafine cellulose fibers obtained in the second embodiment. The composition comprising ultrafine cellulose fibers and the material comprising ultrafine cellulose fibers are preferably used, for example, as a thickener. In this case, the redispersed slurry of the composition comprising ultrafine cellulose fibers or the material comprising ultrafine cellulose fibers may be used as a thickener in various applications (such as foods, cosmetics, cement, paints, and additives to inks). A mixture with a resin or an emulsion may be used in an application of a reinforcing material. Further, a film may be formed using a redispersed slurry of ultrafine cellulose fibers, and used as various films.

EXAMPLES

The features of the present invention will be described more specifically with reference to Examples and Comparative Examples. The materials, amount of use, ratio, treatment content, treatment procedure and the like shown in the following Examples may be appropriately changed without departing from the spirit of the present invention. Therefore, the scope of the present invention should not be interpreted restrictively by the following specific examples.

Production Example 1

Production of Ultrafine Cellulose Fibers 1 (CNF1)

100 g of urea, 55.3 g of sodium dihydrogen phosphate dihydrate, and 41.3 g of disodium hydrogen phosphate were dissolved in 109 g of water to prepare a phosphorylation reagent.

A formed sheet made of dried needle bleached kraft pulp was treated with a cutter mill and a pin mill to prepare flocculent fibers. 100 g (absolute dry mass) of these flocculent fibers were weighed, and using a spray, the phosphorylation reagent was uniformly sprayed to the fibers. Thereafter, the resulting fibers were kneaded by hands to obtain drug-impregnated pulp.

The obtained drug-impregnated pulp was subjected to a heat treatment for 160 minutes in a damped air drying machine that had been heated to 140° C., so as to obtain phosphorylated pulp.

Thereafter, 100 g (pulp mass) of the obtained phosphorylated pulp was weighed, and 10 L of ion exchange water was then poured therein. The fibers were uniformly dispersed by stirring, and the obtained mixture was then subjected to filtration and dehydration to obtain a dehydration sheet. This step was repeatedly carried out twice. Subsequently, the obtained dehydration sheet was diluted with 10 L of ion exchange water. While stirring, a 1 N sodium hydroxide aqueous solution was gradually added to the reaction solution to obtain pulp slurry with a pH value of 12 to 13. Thereafter, this pulp slurry was dehydrated to obtain a dehydration sheet, and 10 L of ion exchange water was then added thereto. The obtained mixture was uniformly dispersed by stirring, and was then subjected to filtration and dehydration to obtain a dehydration sheet. This step was repeatedly carried out twice. The obtained dehydration sheet was measured by the FT-IR measurement of infrared absorption spectra. As a result, absorption based on a phosphoric acid group was observed at 1230 to 1290 cm$^{-1}$, so that addition of the phosphoric acid group could be confirmed. Accordingly, in the obtained dehydration sheet (phosphoric acid-oxo acid introduced cellulose), a portion of the hydroxyl groups of the cellulose was substituted by a functional group represented by the following structural formula (1):

[Formula 1]

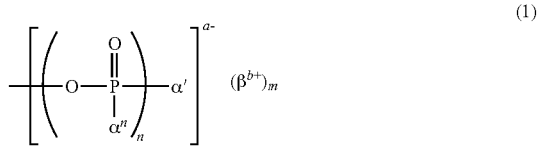

wherein, a, b, m, and n each independently represent a natural number (provided that a=b×m). In addition α$^1$, α$^1$, ..., α$^n$ and α' each independently represent R or OR. R represents any one of a hydrogen atom, a saturated straight chain hydrocarbon group, a saturated branched chain hydrocarbon group, a saturated cyclic hydrocarbon group, an unsaturated straight chain hydrocarbon group, an unsaturated branched chain hydrocarbon group, an aromatic group, and a derivative thereof. β represents mono- or more-valent cation consisting of an organic or inorganic matter.

Ion exchange water was added to the obtained phosphorylated cellulose to prepare 0.5% by mass of slurry. This slurry was subjected to a defibration treatment for 30 minutes using a defibration treatment device (CLEARMIX-2.2S, manufactured by M Technique Co., Ltd.) under conditions of 21500 rotations/min, so as to obtain a cellulose 1 suspension.

This cellulose 1 suspension was further treated once with a wet pulverizing device ("Ultimizer" manufactured by Sugino Machine Limited) at a pressure of 245 MPa to obtain ultrafine cellulose fibers 1 (CNF 1). The ultrafine cellulose fibers 1 (CNF 1) retained a cellulose type I crystal according to X-ray diffraction.

(Measurement of Amount of Substituent Introduced (Amount of Phosphoric Acid Group Introduced))

The amount of the substituent introduced means the amount of the phosphoric acid group introduced into a fiber raw material. The larger the value, the larger the amount of phosphoric acid group introduced into the fiber. The amount of the substituent introduced was measured by diluting the target ultrafine cellulose fiber with ion exchange water so that the content was 0.2% by mass, treating with ion exchange resin, and titrating using alkali. In the treatment with ion exchange resin, a strongly acidic ion exchange resin (AMBERJET 1024, ORGANO CORPORATION, conditioned) was added, at a volume ratio of 1/10, to a slurry containing 0.2% by mass of cellulose fiber, and the mixture was shaken for 1 hour. Then the resultant was poured on a mesh having a mesh size of 90 μm to separate the resin from the slurry. In the titration using alkali, a 0.1 N aqueous sodium hydroxide solution was added to the slurry containing cellulose fiber after the ion exchange to measure a change in values of electric conductivity of the slurry. In other words, the amount of the alkali (mmol) required in the first region in the curve shown in FIG. 1 was divided by the solid content (g) in the slurry, which was the target of titration, to determine the amount of the substituent introduced (mmol/g).

Production Example 2

Production of Ultrafine Cellulose Fibers 2 (CNF 2)

Undried, needle bleached kraft pulp in an amount equivalent to 200 g on a dry basis, 2.5 g of TEMPO, and 25 g of sodium bromide were dispersed in 1500 ml of water. Then, a 13% by mass aqueous sodium hypochlorite solution was added thereto so that the amount of sodium hypochlorite was 5.0 mmol based on 1.0 g of the pulp to initiate the reaction. The pH was kept at pH 10 to 11 during the reaction by adding a 0.5 M aqueous sodium hydroxide solution, and the reaction was terminated when the pH did not change.

Thereafter, this slurry was dehydrated to obtain a dehydration sheet, and 10 L of ion exchange water was then added thereto. Subsequently, the fibers were uniformly dispersed by stirring, and the obtained mixture was then subjected to filtration and dehydration to obtain a dehydration sheet. This step was repeatedly carried out twice. The obtained dehydration sheet was measured by the FT-IR measurement of infrared absorption spectra. As a result, absorption based on a carboxyl group was observed at 1730 $cm^{-1}$, so that addition of the carboxyl group could be confirmed. Using this dehydration sheet (TEMPO oxidized cellulose), ultrafine cellulose fibers were prepared.

Ion exchange water was added to the thus obtained carboxyl group-added TEMPO oxidized cellulose to prepare 0.5% by mass of slurry. This slurry was subjected to a defibration treatment for 30 minutes using a defibration treatment device (CLEARMIX-2.2S, manufactured by M Technique Co., Ltd.) under conditions of 21500 rotations/min, so as to obtain a cellulose 2 suspension.

This cellulose 2 suspension was further treated 10 times with a wet pulverizing device ("Ultimizer" manufactured by Sugino Machine Limited) at a pressure of 245 MPa to obtain ultrafine cellulose fibers 2 (CNF 2). The ultrafine cellulose fibers 2 (CNF 2) retained a cellulose type I crystal according to X-ray diffraction.

<Measurement of Fiber Width>

Fiber widths of the ultrafine cellulose fibers 1 and 2 were measured by the following method.

A supernatant of defibrated pulp slurry was diluted with water to a concentration of 0.01% to 0.1% by mass, and the obtained solution was then added dropwise onto a hydrophilized carbon grid film. After drying, it was stained with uranyl acetate, and was then observed under a transmission electron microscope (JEOL-2000EX, manufactured by JEOL). In Production Examples 1 and 2, it was confirmed that ultrafine cellulose fibers having a width of approximately 4 nm was obtained.

The degrees of crystallinity of the ultrafine cellulose fibers 1 and 2 were measured using an X-ray diffractometer and calculated from the following expression. The "crystallinity index" in the following expression is also referred to as "degree of crystallinity".

$$\text{Cellulose type } I \text{ crystallinity index } (\%) = [(I_{22.6} - I_{18.5})/I_{22.6}] \times 100 \quad (1)$$

wherein, $I_{22.6}$ is the diffraction intensity of the lattice plane (002) (diffraction angle 2θ=22.6°) in X-ray diffraction, and $I_{18.5}$ is the diffraction intensity of an amorphous region (diffraction angle 2θ=18.5°).

$$0.45 \leq \alpha\omega \text{ (m·rad/sec)} \quad (2)$$

wherein, α is a half amplitude (m), and ω is an angular velocity (rad/sec).

The amounts of substituents and degree of crystallinity of the ultrafine cellulose fibers 1 and 2 are shown in Table 1.

|  | Type of substituent | Amount of substituent (mmol/g) | Degree of crystallinity (%) |
|---|---|---|---|
| Production Example 1 | Ultrafine cellulose fibers 1 | Phosphoric acid group | 1.54 | 85 |
| Production Example 2 | Ultrafine cellulose fibers 2 | Carboxyl group | 1.00 | 82 |

First Embodiment

Example 1

CNF 1 was diluted with water to a solid concentration of 0.4% by mass. To 100 mL of this diluted liquid 1 g of calcium chloride was added as a concentrating agent to cause gelation. After filtrating the gel, it was compressed with a filter paper for 2 min to obtain a concentrate having a solid concentration of 21.4% by mass. The concentrate was immersed in 100 mL of a 0.1 N aqueous solution of hydrochloric acid for 30 min and then filtrated to obtain a concentrate having a solid concentration of 21.2% by mass. The remainder of the concentrate other than the solid content is water.

To 96.2 parts by mass of the concentrate, 3.8 parts by mass of silica (AEROSIL® R 812 S (Nippon Aerosil), hereinafter referred to as "Silica A") was added and stirred with a mixer. In this way, a composition containing ultrafine cellulose fibers of Example 1 was obtained.

Example 2

A concentrate was obtained identically with Example 1 except that the compression time with the filter paper in Example 1 was changed to 30 sec. The solid concentration of the concentrate was 4.1% by mass. The concentrate was immersed in 100 mL of a 0.1 N aqueous solution of hydrochloric acid for 30 min and then filtrated to obtain a concentrate having a solid concentration of 5.6% by mass. The subsequent treatment was the same as in Example 1, and a composition containing ultrafine cellulose fibers of Example 1 was obtained.

Example 3

A concentrate was obtained identically with Example 1 except that the compression time with the filter paper in Example 1 was changed to 60 sec. The solid concentration of the concentrate was 8.1% by mass. The concentrate was immersed in 100 mL of a 0.1 N aqueous solution of hydrochloric acid for 30 min and then filtrated to obtain a concentrate having a solid concentration of 10.5% by mass. The subsequent treatment was the same as in Example 1, and a composition containing ultrafine cellulose fibers of Example 3 was obtained.

Example 4

A concentrate was obtained identically with Example 1. The solid concentration of the concentrate was 21.4% by mass. The concentrate was immersed in 100 mL of a 0.1 N aqueous solution of hydrochloric acid for 30 min and then filtrated to obtain a concentrate having a solid concentration of 21.2% by mass. The concentrate was heat-treated in an oven at 60° C. for 15 min to obtain a concentrate having a solid concentration of 31.2% by mass. To 96.2 parts by mass of this concentrate, 3.8 parts by mass of silica (AEROSIL® R 812 S, manufactured by Nippon Aerosil Co., Ltd., hereinafter referred to as "Silica A") was added and stirred with a mixer. In this way, a composition containing ultrafine cellulose fibers of Example 4 was obtained.

Example 5

A composition containing ultrafine cellulose fibers of Example 5 was obtained identically with Example 4 except that the heating time in the oven at 60° C. was changed to 25 min and a concentrate having a solid concentration of 42.2% by mass was obtained.

Example 6

A composition containing ultrafine cellulose fibers of Example 6 was obtained identically with Example 4 except that the heating time in the oven at 60° C. was changed to 35 min and a concentrate having a solid concentration of 50.3% by mass was obtained.

Example 7

A composition containing ultrafine cellulose fibers of Example 7 was obtained identically with Example 4 except that the heating time in the oven at 60° C. was changed to 45 min and a concentrate having a solid concentration of 63.5% by mass was obtained.

Example 8

A composition containing ultrafine cellulose fibers of Example 8 was obtained identically with Example 4 except that the heating time in the oven at 60° C. was changed to 50 min and a concentrate having a solid concentration of 94.1% by mass was obtained.

Example 9

CNF 2 was diluted with water to a solid concentration of 0.4% by mass. To 100 mL of this diluted liquid 1 g of calcium chloride was added as a concentrating agent to cause gelation. After filtrating the gel, it was compressed with a filter paper for 2 min to obtain a concentrate having a solid concentration of 19.8% by mass. The concentrate was immersed in 100 mL of a 0.1 N aqueous solution of hydrochloric acid for 30 min and then filtrated to obtain a concentrate having a solid concentration of 20.2% by mass. The subsequent treatments were the same as in Example 1 to obtain a composition containing ultrafine cellulose fibers of Example 9.

Example 10

A composition containing ultrafine cellulose fibers of Example 10 was obtained identically with Example 1 except that Silica A was changed to Silica B (AEROSIL® 200, manufactured by Nippon Aerosil Co., Ltd.).

Example 11

A composition containing ultrafine cellulose fibers of Example 11 was obtained identically with Example 1 except that Silica A was changed to hydrophobized titanium oxide (STV-455, manufactured by Titan Kogyo Co., Ltd.).

Example 12

A composition containing ultrafine cellulose fibers of Example 12 was obtained identically with Example 1 except that the amount of Silica A added was changed to 0.5 part by mass with respect to 99.5 parts by mass of the concentrate.

Example 13

A composition containing ultrafine cellulose fibers of Example 13 was obtained identically with Example 1 except that the amount of Silica A added was changed to 4.8 parts by mass with respect to 95.2 parts by mass of the concentrate.

Example 14

A composition containing ultrafine cellulose fibers of Example 14 was obtained identically with Example 1 except that the amount of Silica A added was changed to 9.1 parts by mass with respect to 90.9 parts by mass of the concentrate.

Comparative Example 1

A composition containing ultrafine cellulose fibers of Comparative Example 1 was obtained identically with Example 1 except that Silica A in Example 1 was not added.

Reference Example 1

A composition containing ultrafine cellulose fibers of Reference Example 1 was obtained in the same manner as in Example 4 except that the heating time in the oven at 60° C. was changed to 90 min, and a concentrate of 98.3% by mass was obtained.

Comparative Example 3

A composition containing ultrafine cellulose fibers of Comparative Example 3 was obtained identically with Example 1 except that the amount of Silica A added was changed to 0.05 part by mass with respect to 99.95 parts by mass of the concentrate.

Comparative Example 4

A composition containing ultrafine cellulose fibers of Comparative Example 4 was obtained identically with Example 1 except that the amount of Silica A added was changed to 13 parts by mass with respect to 87 parts by mass of the concentrate.

The physical properties of the non-cellulose silicas used in Examples and Comparative Examples are as follows.

ONE Corporation). A composition containing ultrafine cellulose fibers in an amount of 100 mL was placed in the chute of the angle of repose tester, and the chute gate was opened to drop downward the composition containing ultrafine cellulose fibers to fill a container (full volume V=50 mL) placed on the bottom to form a heap. Then the heap of the composition containing ultrafine cellulose fibers was leveled off to fill the space just full. The mass of the composition containing ultrafine cellulose fibers remaining in the container was weighed and the bulk density (g/mL) was calculated from the following expression.

Bulk density (g/mL)=Mass of powder (g)/Volume of powder (mL)

(Evaluation)
(Evaluation of Feedability)

A composition containing ultrafine cellulose fibers obtained in the Examples and Comparative Examples was placed in a beaker (volume 100 mL) and the mass W 1 (g) was weighed. The beaker was gently rotated upside down 180° to drop the powder. The mass W 2 (g) of the dropped composition containing ultrafine cellulose fibers was weighed. The ratio of the mass of the dropped composition containing ultrafine cellulose fibers to the mass of the placed composition containing ultrafine cellulose fibers was calculated by the following expression, and the feedability was rated according to the following rating criteria. In this regard, good feedability means herein good fluidity of the composition.

Feedability (%)=$W2/W1 \times 100$

TABLE 2

| Product | Hydrophilic/Hydrophobic | Specific surface area by BET method [m²/g] | Drying loss [% by mass] | pH | Carbon content [% by mass] | Hydrophobic group | Primary particle diameter [nm] |
| --- | --- | --- | --- | --- | --- | --- | --- |
| AEROSIL R 812 S | Hydrophobic | 720 ± 75 | ≤0.5 | 5.5-9.0 | 3.0-4.0 | Trimethylsilyl | 7 |
| AEROSIL 200 | Hydrophilic | 200 ± 25 | — | 4.0-4.5 | 0 | — | 12 |

(Measurement of Angle of Repose)

The angle of repose of a composition containing ultrafine cellulose fibers obtained in the Examples and Comparative Examples was measured using an angle of repose tester (AS ONE Corporation). A composition containing ultrafine cellulose fibers in an amount of 100 mL was placed in the chute of the angle of repose tester, and the chute gate was opened to drop downward the composition containing ultrafine cellulose fibers. Then, the angle made by the slope of the dropped composition containing ultrafine cellulose fibers and the horizontal plane was measured, which was defined as the angle of repose.

(Measurement of Cumulative Median Diameter)

The cumulative median diameter of a composition containing ultrafine cellulose fibers obtained in the Examples and Comparative Examples was measured by a laser diffraction scattering particle diameter distribution analyzer (Microtrac 3300 EXII, Nikkiso Co., Ltd.).

(Measurement of Bulk Density)

The bulk density of a composition containing ultrafine cellulose fibers obtained in the Examples and Comparative Examples was measured using an angle of repose tester (AS <Feedability Rating Criteria>

⊙: 95% or higher

○: not less than 80%, and less than 95% x: less than 80%

(Evaluation of Redispersibility)

A composition containing ultrafine cellulose fibers obtained in the Examples and Comparative Examples was added to 100 mL of ion exchanged water and neutralized with sodium hydroxide. The aqueous solution was stirred at 1,500 rpm for 5 min to prepare a solution containing 0.4% by mass of ultrafine cellulose fibers. The solution was allowed to stand for 30 min, and existence or non-existence of separation was observed, and the redispersibility was rated according to the following criteria.

<Rating Criteria for Redispersibility>

⊙: Uniformly dispersed without separation from water.

○: Slight turbidity is visible, but dispersed without separation from water x: Separated from water.

TABLE 3

| | Example 1 | Example 2 | Example 3 | Example 4 | Example 5 | Example 6 | Example 7 | Example 8 | Example 9 | Example 10 | Example 11 | Comparative Example 1 | Reference Example 1 |
|---|---|---|---|---|---|---|---|---|---|---|---|---|---|
| Type of CNF | CNF1 | CNF1 | CNF1 | CNF1 | CNF1 | CNF1 | CNF1 | CNF1 | CNF2 | CNF1 | CNF1 | CNF1 | CNF1 |
| Solid concentration of CNF after concentration (% by mass) | 21.2 | 5.6 | 10.5 | 31.2 | 42.2 | 50.3 | 63.5 | 94.1 | 20.2 | 21.2 | 21.2 | 21.2 | 98.3 |
| Amount of water with respect to total composition (% by mass) | 75.8 | 90.8 | 86.1 | 66.2 | 55.6 | 47.8 | 35.1 | 5.7 | 76.7 | 75.8 | 75.8 | 75.8 | 1.6 |
| Amount of CNF with respect to total composition (% by mass) | 20.4 | 5.4 | 10.1 | 30.0 | 40.6 | 48.4 | 61.1 | 90.5 | 19.5 | 20.4 | 20.4 | 20.4 | 94.6 |
| Non-cellulose ultrafine particulate material | Hydrophobic silica (AEROSIL R 812 S) | | | | | | | | | Hydrophilic silica (AEROSIL 200) | Hydrophobized titanium oxide (STV-455) | — | Hydrophobic silica (AEROSIL R 812 S) |
| Amount of non-cellulose ultrafine particulate material with respect to total composition (% by mass) | | | | | | | | 3.8 | | | | — | 3.8 |
| Dehydration method | Multivalent metal → Acid washing | Multivalent metal → Acid washing | Multivalent metal → Acid washing | Multivalent metal → Acid washing → Oven | Multivalent metal → Acid washing → Oven | Multivalent metal → Acid washing → Oven | Multivalent metal → Acid washing → Oven | Multivalent metal → Acid washing → Oven | Multivalent metal → Acid washing | Multivalent metal → Acid washing | Multivalent metal → Acid washing | Multivalent metal → Acid washing | Multivalent metal → Acid washing |
| Angle of repose (°) | 20 | 44 | 41 | 17 | 16 | 10 | 8 | 5 | 21 | 45 | 48 | 52 | 3 |
| Cumulative median diameter (μm) | 1178 | 1199 | 1201 | 1082 | 982 | 630 | 421 | 218 | 1101 | 1276 | 1289 | 1400 | 82 |
| Bulk density (g/mL) | 0.36 | 0.13 | 0.19 | 0.31 | 0.25 | 0.21 | 0.52 | 0.68 | 0.35 | 0.14 | 0.14 | 0.08 | 0.72 |
| Rating of feedability | ⊙ | ○ | ○ | ⊙ | ⊙ | ⊙ | ⊙ | ⊙ | ⊙ | ○ | ○ | × | ⊙ |
| Rating of redispersibility | ⊙ | ⊙ | ⊙ | ⊙ | ⊙ | ⊙ | ○ | ○ | ⊙ | ○ | ○ | ○ | × |

TABLE 4

| | Comparative Example 3 | Example 12 | Example 13 | Example 14 | Comparative Example 4 |
|---|---|---|---|---|---|
| Type of CNF | CNF1 | CNF1 | CNF1 | CNF1 | CNF1 |
| Solid concentration of CNF after concentration (% by mass) | 21.2 | 21.2 | 21.2 | 21.2 | 21.2 |
| Amount of water with respect to total composition (% by mass) | 78.8 | 78.4 | 75.0 | 71.6 | 68.5 |
| Amount of CNF with respect to total composition (% by mass) | 21.15 | 21.1 | 20.2 | 19.3 | 18.5 |
| Non-cellulose ultrafine particulate material | Hydrophobic silica (AEROSIL R 812 S) | | | | |

TABLE 4-continued

|  | Comparative Example 3 | Example 12 | Example 13 | Example 14 | Comparative Example 4 |
|---|---|---|---|---|---|
| Amount of non-cellulose ultrafine particulate material with respect to total composition (% by mass) | 0.05 | 0.5 | 4.8 | 9.1 | 13.0 |
| Dehydration method |  | Multivalent metal → Acid washing | | | |
| Angle of repose (°) | 51 | 38 | 20 | 11 | 3 |
| Cumulative median diameter (μm) | 1521 | 1189 | 1164 | 872 | 34 |
| Bulk density (g/mL) | 0.09 | 0.23 | 0.36 | 0.48 | 0.77 |
| Rating of feedability | X | ⊚ | ⊚ | ⊚ | X |
| Rating of redispersibility | ○ | ⊚ | ⊚ | ⊚ | X |

A composition containing ultrafine cellulose fibers obtained in the above Examples was excellent in feedability and redispersibility. On the other hand, it was obvious that a composition containing ultrafine cellulose fibers obtained in Comparative Example was inferior in feedability and did not have favorable properties.

Second Embodiment

Example 101

CNF 1 was dispersed in water so as to lead to a solid concentration of 0.01% by mass. A hydrophobic titanium oxide (STV-455, manufactured by Titan Kogyo Co., Ltd.) was added to the dispersion up to 10% by mass with respect to the total mass of CNF 1, and the mixture was stirred until it became uniform. The yielded dispersion was spray-dried using a spray drier (Model ODA-25, manufacture by Ohkawara Kakohki Co., Ltd.). The spray dryer had a drying oven into which hot air was fed. The inlet temperature of the drying oven into which hot air was fed was set at 200° C., and the outlet temperature was set at 90° C. The amount of water evaporated in the drying oven was 50 kg/hour. The spray dryer was equipped with an atomizer for spraying the dispersion, and the number of revolutions of the atomizer was set at 17000 rpm. In this way, a material containing ultrafine cellulose fibers of Example 101 was yielded. The water content of the material containing ultrafine cellulose fibers was not higher than 5% by mass.

Example 102

A material containing ultrafine cellulose fibers of Example 102 was obtained identically with Example 101 except that CNF 1 was dispersed in water so as to lead to a solid concentration of 0.1% by mass.

Example 103

A material containing ultrafine cellulose fibers of Example 103 was obtained identically with Example 101 except that CNF 1 was dispersed in water so as to lead to a solid concentration of 0.2% by mass.

Example 104

A material containing ultrafine cellulose fibers of Example 104 was obtained identically with Example 101 except that CNF 1 was dispersed in water so as to lead to a solid concentration of 0.5% by mass.

Example 105

A material containing ultrafine cellulose fibers of Example 105 was obtained identically with Example 101 except that CNF 1 was dispersed in water so as to lead to a solid concentration of 1.0% by mass.

Example 106

A material containing ultrafine cellulose fibers of Example 106 was obtained identically with Example 101 except that CNF 1 was dispersed in water so as to lead to a solid concentration of 2.0% by mass.

Example 107

A material containing ultrafine cellulose fibers of Example 107 was obtained identically with Example 101 except that CNF 1 was dispersed in water so as to lead to a solid concentration of 3.0% by mass.

Example 108

A material containing ultrafine cellulose fibers of Example 108 was obtained identically with Example 101 except that CNF 1 was dispersed in water so as to lead to a solid concentration of 4.0% by mass.

Example 109

A material containing ultrafine cellulose fibers of Example 109 was obtained identically with Example 101 except that CNF 1 was dispersed in water so as to lead to a solid concentration of 5.0% by mass.

Example 110

A material containing ultrafine cellulose fibers of Example 110 was obtained identically with Example 103 except that CNF 1 was changed to CNF 2.

Comparative Example 101

A material containing ultrafine cellulose fibers of Comparative Example 101 was obtained identically with Example 101 except that CNF 1 was dispersed in water so as to lead to a solid concentration of 6.0% by mass.

Comparative Example 102

A material containing ultrafine cellulose fibers of Comparative Example 102 was obtained identically with Example 101 except that CNF 1 was dispersed in water so as to lead to a solid concentration of 0.008% by mass.

Comparative Example 103

CNF 1 was dispersed in water so as to lead to a solid concentration of 0.2% by mass. The dispersion was poured into a Teflon® petri dish, and dried in an oven set at 60° C. for 120 min.
(Evaluation)
(Evaluation of Feedability)

Identically with the evaluation method of feedability with respect to the aforementioned Examples and Comparative Examples, the feedability of a material containing ultrafine cellulose fibers was evaluated.

TABLE 5

| | Example 101 | Example 102 | Example 103 | Example 104 | Example 105 | Example 106 | Example 107 | Example 108 | Example 109 | Example 110 | Comparative Example 101 | Comparative Example 102 | Comparative Example 103 |
|---|---|---|---|---|---|---|---|---|---|---|---|---|---|
| Type of CNF | CNF1 | CNF1 | CNF1 | CNF1 | CNF1 | CNF1 | CNF1 | CNF1 | CNF1 | CNF2 | CNF1 | CNF1 | CNF1 |
| Concentration of CNF dispersion in spray drying (% by mass) | 0.01 | 0.1 | 0.2 | 0.5 | 1.0 | 2.0 | 3.0 | 4.0 | 5.0 | 0.2 | 6.0 | 0.008 | 0.2 |
| Amount of titanium oxide added (% by mass with respect to CNF) | | | | | | | | 10 | | | | | |
| Dehydration method | Spray drying | | | | | | | | | | | | Oven drying |
| Rating of feedability | ⊙ | ⊙ | ⊙ | ⊙ | ⊙ | ⊙ | ○ | ○ | ○ | ⊙ | × | × | × |

The materials containing ultrafine cellulose fibers obtained in the above Examples were excellent in feedability. On the other hand, it was obvious that the materials containing ultrafine cellulose fibers obtained in Comparative Examples were inferior in feedability, and therefore did not have favorable characteristics. In this regard, the material containing ultrafine cellulose fibers obtained in Comparative Example 101 had a large average particle diameter and was inferior in feedability. Meanwhile, the material containing ultrafine cellulose fibers obtained in Comparative Example 102 was fibrillated to ultrafine fibers to deteriorate the feedability. Through comparison between Comparative Example 103 and Examples, it became clear that the material containing ultrafine cellulose fibers granulated by the spray drying method was superior in feedability.

INDUSTRIAL APPLICABILITY

According to the present invention, a composition comprising ultrafine cellulose fibers and a material comprising ultrafine cellulose fibers having excellent fluidity (feedability) can be produced.

REFERENCE SIGNS LIST

2 Slurry vessel
4 Pump
6 Pressurized air generator
10 Drying oven
12 Inlet temperature sensor
14 Outlet temperature sensor
20 Sprayer
30 Hot air generator
40 Collector
50 Recovery tank
100 Spray dryer

The invention claimed is:

1. A composition comprising a mixture of:
   (A) a particulate material comprising ultrafine cellulose fibers and water, and
   (B) a non-cellulose particulate material,
   wherein the water content of the composition is 2 to 94% by mass with respect to the total mass of the composition,
   the particulate material (A) and the non-cellulose particulate material (B) are dispersed throughout the composition, and
   the content of (B) the non-cellulose particulate material is 0.1 to 12% by mass with respect to the total mass of the composition.

2. The composition according to claim 1, wherein the content of the ultrafine cellulose fibers is larger than 5% by mass with respect to the total mass of the composition.

3. The composition according to claim 1, wherein the water content of the composition is 15 to 80% by mass with respect to the total mass of the composition.

4. The composition according to claim 1, wherein (B) the non-cellulose particulate material is an inorganic fine particle.

5. The composition according to claim 1, wherein (B) the non-cellulose particulate material is a hydrophobic inorganic fine particle.

6. The composition according to claim 1, wherein (B) the non-cellulose particulate material is a silica fine particle.

7. The composition according to claim 1, wherein (B) the non-cellulose particulate material is a hydrophobic silica fine particle.

8. The composition according to claim 1, wherein the cumulative median diameter of the composition is 100 to 1350 μm.

9. The composition according to claim 1, wherein the angle of repose of the composition is 4 to 50°.

10. The composition according to claim 1, wherein the bulk density of the composition is 0.1 to 0.7 g/mL.

11. The composition according to claim 1, wherein the ultrafine cellulose fibers are ultrafine cellulose fibers having an ionic substituent.

* * * * *